US007176467B2

(12) United States Patent
Sandrik et al.

(10) Patent No.: US 7,176,467 B2
(45) Date of Patent: Feb. 13, 2007

(54) SYSTEMS, METHODS AND APPARATUS FOR DETERMINING DEVIATION OF AN X-RAY FIELD, A LIGHT FIELD AND A PRIMARY RECEPTOR

(75) Inventors: John Michael Sandrik, Wauwatosa, WI (US); Rowland F. Saunders, Hartland, WI (US); Jerry A. Thomas, Potomac, WI (US)

(73) Assignee: General Electric Company, Schenectady, NY (US)

(*) Notice: Subject to any disclaimer, the term of this patent is extended or adjusted under 35 U.S.C. 154(b) by 271 days.

(21) Appl. No.: 11/002,007

(22) Filed: Dec. 2, 2004

(65) Prior Publication Data

US 2006/0118701 A1 Jun. 8, 2006

(51) Int. Cl.
*H01J 40/14* (2006.01)

(52) U.S. Cl. ................................ 250/370.11; 600/434

(58) Field of Classification Search ........... 250/370.11, 250/214 R; 600/434, 585; 604/529
See application file for complete search history.

(56) References Cited

U.S. PATENT DOCUMENTS 5,431,639 A * 7/1995 Shaw ......................... 604/264
5,480,439 A * 1/1996 Bisek et al. ................ 128/898
6,159,141 A * 12/2000 Apple et al. ................... 600/3
6,162,165 A * 12/2000 Apple et al. ................... 600/3
6,251,059 B1 * 6/2001 Apple et al. ................... 600/3
6,428,512 B1 * 8/2002 Anderson et al. ...... 604/170.01
6,494,824 B1 * 12/2002 Apple et al. ................... 600/3

OTHER PUBLICATIONS

Unfors; Direct X-ray Ruler brochure., Jul. 28, 2004, Uggledalsvagen 29, SE-427 40 Billdal, Sweden.

* cited by examiner

*Primary Examiner*—Otilia Gabor
(74) *Attorney, Agent, or Firm*—Carl Horton; Peter Vogel; Michael Smith

(57) ABSTRACT

Systems, methods and apparatus are provided through which, in some embodiments, an electronic sensor is positioned in the field of projection of an X-ray source, and the electronic sensor measures the deviation between a visible light field and an X-ray field. In some embodiments, the deviation is scaled in reference to the position of the electronic sensor between an X-ray receptor and the X-ray source.

88 Claims, 24 Drawing Sheets

500

800

1200

1500

2428
REMOTE COMPUTER
NIC
2436
2400

2430
LAN
2432
WAN
2426
SPEAKER
NIC
2434
2438
POWER
2420
POINTING DEVICE
SPEAKER
KEYBOARD
2424
2412
2418
DISPLAY
CPU
RAM
ROM
MASS STORAGE
COMM
INTERNET
2404
2406
2408
2410
2416
2422
2402
2414

SYSTEMS, METHODS AND APPARATUS FOR DETERMINING DEVIATION OF AN X-RAY FIELD, A LIGHT FIELD AND A PRIMARY RECEPTOR

FIELD OF THE INVENTION

This invention relates generally to determining alignment of an electromagnetic field with another electromagnetic field and determining alignment of an electromagnetic field with a primary receptor, and more particularly to determining alignment of an X-ray field with visible light field and determining alignment of an X-ray field with a primary receptor.

BACKGROUND OF THE INVENTION

In X-ray imaging systems, an X-ray field is projected through a subject and onto a receptor, the receptor either being a chemically coated X-ray sensitive film or an electronic receptor. In recent years, there has been a trend towards increasing use of electronic receptors.

The outer boundary of the X-ray field must be approximately aligned with the outer perimeter of the receptor in order to maximize the field of view of the image by projecting the X-ray field onto the entire receptor, without projecting the X-ray field outside of the outer perimeter of the receptor which could cause unnecessary patient exposure to the X-ray field.

However it is difficult to align the X-ray field with the receptor because the X-ray field is invisible to the naked human eye. Accordingly, conventional X-ray imaging systems project a field of visible light that is aligned with the X-ray field. The field of visible light acts as a proxy of the location of the X-ray field to an X-ray technician who positions the X-ray projector, the subject, and the receptor before the X-ray field is projected. In essence, the light field mimics the position and outline of the X-ray field. The visible light field is projected onto the receptor before the X-ray field is projected to verify that the X-ray field will be projected into the receptor during X-ray imaging. The visible light field is also known as a localizing light.

The importance of aligning the X-ray field with the receptor is well accepted. Nonetheless, if the X-ray field is not aligned or coincident with the visible light field, then when the visible light field is aligned with the receptor, the X-ray field will not be aligned with the receptor. In fact, when the light field and the X-ray field are misaligned to an extent, and the visible light field is aligned with the receptor, the result is that the X-ray field will be misaligned with receptor to that extent.

Accordingly, the alignment or coincidence of the visible light field and the X-ray field must be tested and realigned until the visible light field and the X-ray are aligned within prescribed tolerances. In one conventional technique of testing the alignment, an auxiliary film image receptor with a field of view exceeding that of the primary image receptor is used to delineate the X-ray field. The auxiliary image receptor most commonly used is an X-ray sensitive film or a film in a cassette with a scintillator that is X-ray sensitive and emits light to expose the film. By simultaneously imaging common objects on both image receptors, measurements of the X-ray field size made from the auxiliary image receptor can be referenced to the primary one and the degree of alignment is determined.

The process of aligning the visible light field and the X-ray field using auxiliary film image receptors includes the time to remove the auxiliary film image receptors, develop the film and measure the deviation between the visible light field and the X-ray field on the developed film. This time increases the amount of time that the expensive imaging system is not available for use, which in turn increases the operating cost of the imaging system. In addition, the measurement of the deviation is somewhat inconvenient.

Furthermore, the use of such auxiliary film image receptors is becoming increasingly difficult as X-ray imaging equipment replaces film-based image receptors with digital image displays which in turn diminishes the availability of film, film cassettes, and film processors.

For the reasons stated above, and for other reasons stated below which will become apparent to those skilled in the art upon reading and understanding the present specification, there is a need in the art to reduce the operating cost of X-ray imaging systems by decreasing the amount of time in aligning the visible light field and the X-ray field in an X-ray imaging system. In addition, there is also a need in the art to eliminate the use of film in aligning the visible light field and the X-ray field in an X-ray imaging system.

BRIEF DESCRIPTION OF THE INVENTION

The above-mentioned shortcomings, disadvantages and problems are addressed herein, which will be understood by reading and studying the following specification.

As more X-ray imaging equipment incorporates film-less image receptors and digital, electronic image displays, the availability of film, film cassettes, and film processors diminishes. Many modern imaging centers seek to become totally film-less for all imaging modalities.

Accordingly, an alignment test tool comprises at least one solid state detector to locate at least one edge of a first electromagnetic field and of a second electromagnetic field. Electronic logic within the tool calculates and displays to a user the locations of the edges of the first electromagnetic field and second electromagnetic field and the displacement or deviation between the two. Reference points on the alignment test tool are projected into the image acquired by a primary image receptor to facilitate determination of the alignment of the edges of the image receptor to the edges of the second electromagnetic field as defined by the alignment test tool.

In some embodiments, the solid state detectors are more generally photo-sensitive sensors or other types of sensors.

The alignment test tool does not rely on film, film cassettes, or film processing for making the alignment measurement. In radiology departments that are growing increasingly digital and filmless, therefore eliminating the need to use film for quality control and acceptance testing becomes a significant issue. This is also an issue among radiology facilities that seek to have state of the art facilities but subsequently learn that they must maintain access to film and processing to perform quality control procedures.

Providing direct readout of the field positions and their deviations eliminates several of the determinations and calculations that an operator needs to perform to make the measurements. This increases the operator's productivity.

In one aspect, an apparatus includes four alignment test tools, one for each side of a projection field having square angles between each edge of the projection field.

In another aspect, an apparatus having four alignment test tools also includes a controller that is operable to receive signals indicating the electromagnetic fields from the four alignment test tools and that is operable to transmit information describing the locations of the edges through an electronic interface.

In yet another aspect, an apparatus having four alignment test tools also includes a controller that is operable to receive signals indicating the electromagnetic fields from the four alignment test tools and that is operable to display through displays information describing the locations of the edges through an electronic interface.

In still another aspect, an apparatus includes an electronic interface that is operable to receive information describing the locations of the edges through an electronic interface, and a controller is operable to display through displays information describing the locations of the edges through an electronic interface.

Apparatus, systems, and methods of varying scope are described herein. In addition to the aspects and advantages described in this summary, further aspects and advantages will become apparent by reference to the drawings and by reading the detailed description that follows.

DETAILED DESCRIPTION OF THE INVENTION

In the following detailed description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

The detailed description is divided into five sections. In the first section, a system level overview is described. In the second section, apparatus of embodiments are described. In the third section, methods of embodiments are described. In the fourth section, the hardware and the operating environment in conjunction with which embodiments may be practiced are described. Finally, in the fifth section, a conclusion of the detailed description is provided.

System Level Overview

Figure 1:
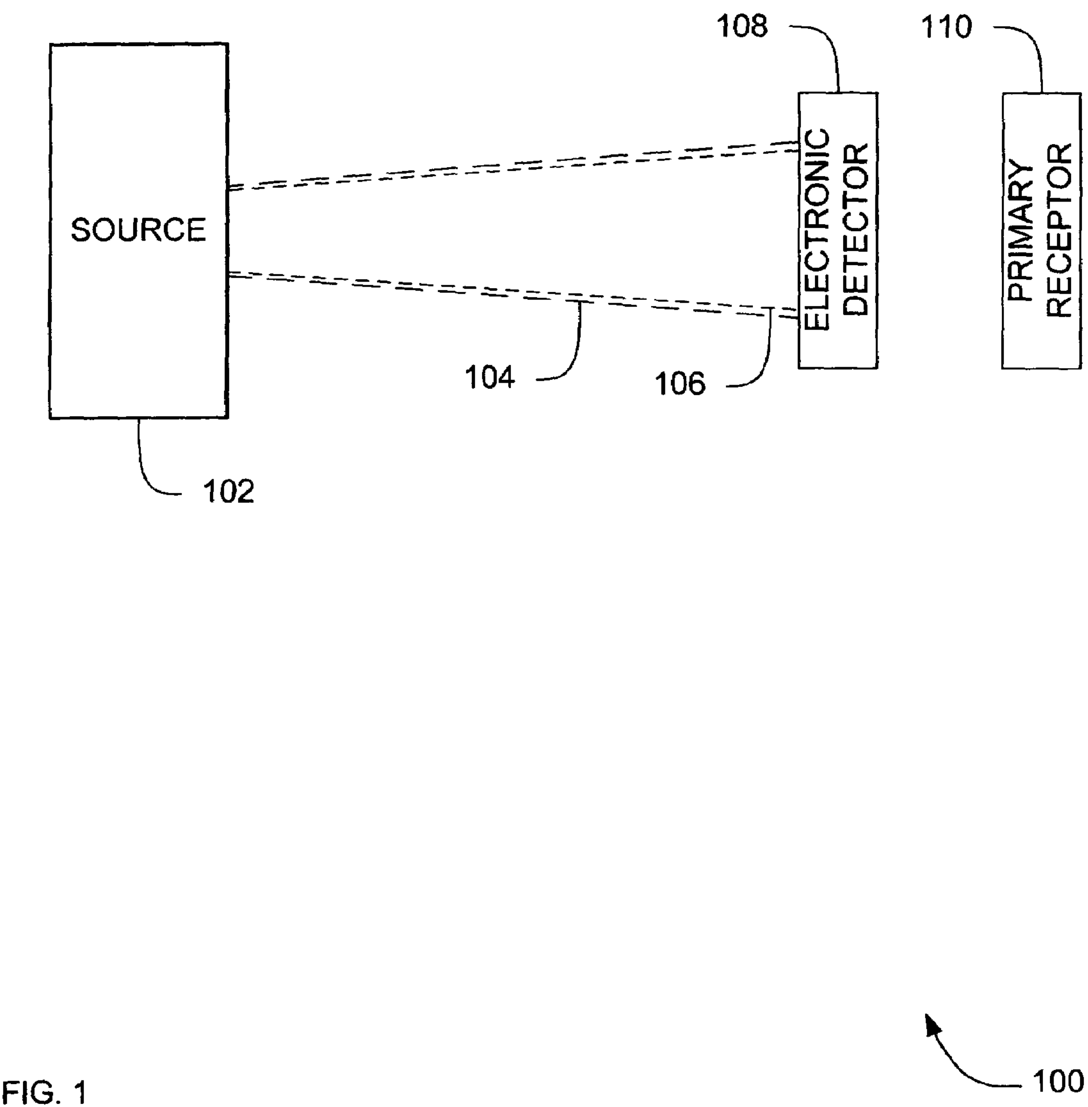
FIG. 1 is a block diagram that provides a system level overview of an apparatus to detect electromagnetic energy of a plurality of wavelengths.

FIG. 1 is a block diagram that provides a system level overview of an apparatus to detect electromagnetic energy of a plurality of wavelengths. Apparatus 100 eliminates the use of film in aligning the visible light field and the X-ray field and increases the speed of aligning those fields in an X-ray imaging system.

System 100 includes one or more sources 102 of two electromagnetic fields 104 and 106. Electromagnetic fields 104 and 106 are divergent beams from the source 102. Electromagnetic field 104 has a different wavelength than electromagnetic field 106.

System 100 also includes an electronic (solid state) device 108 that detects the position of the two electromagnetic fields 104 and 106 at electronic speeds. In some implementations, a deviation in the electromagnetic fields 104 and 106 is determined from the positions.

The electronic detector 108 allows the positions, and thus any deviation of the electromagnetic fields 104 and 106 to be detected quickly which in turn decreases the amount of time detecting deviations, which in turn reduces the amount of time aligning the electromagnetic fields 104 and 106 in an X-ray imaging system, which in turn solves the need in the art to reduce the operating cost of X-ray imaging systems. The electronic detector 108 also solves the need in the art to increase the speed of aligning the visible light field and the X-ray field in an X-ray imaging system. In addition, the electronic detector 108 solves the need in the art to eliminate the use of film in aligning the visible light field and the X-ray field in an X-ray imaging system.

In some embodiments, the system 100 also includes a primary receptor 110 that is used for imaging. In various embodiments, the primary receptor 110 is a film X-ray detector or an electronic X-ray detector. The electronic detector 108 aligns the electromagnetic fields 104 and 106 for use with the primary receptor 110.

The system level overview of the operation of an embodiment is described in this section of the detailed description. While the system 100 is not limited to any particular source(s) 102, electromagnetic fields 104 and 106, electronic detector 108, and primary receptor 110 for sake of clarity, simplified source(s) 102, electromagnetic fields 104 and 106, electronic detector 108 and primary receptor 110 are described.

Apparatus of an Embodiment

In the previous section, a system level overview of the operation of an embodiment was described. In this section, the particular apparatus of such an embodiment are described by reference to a series of diagrams.

Figure 2:
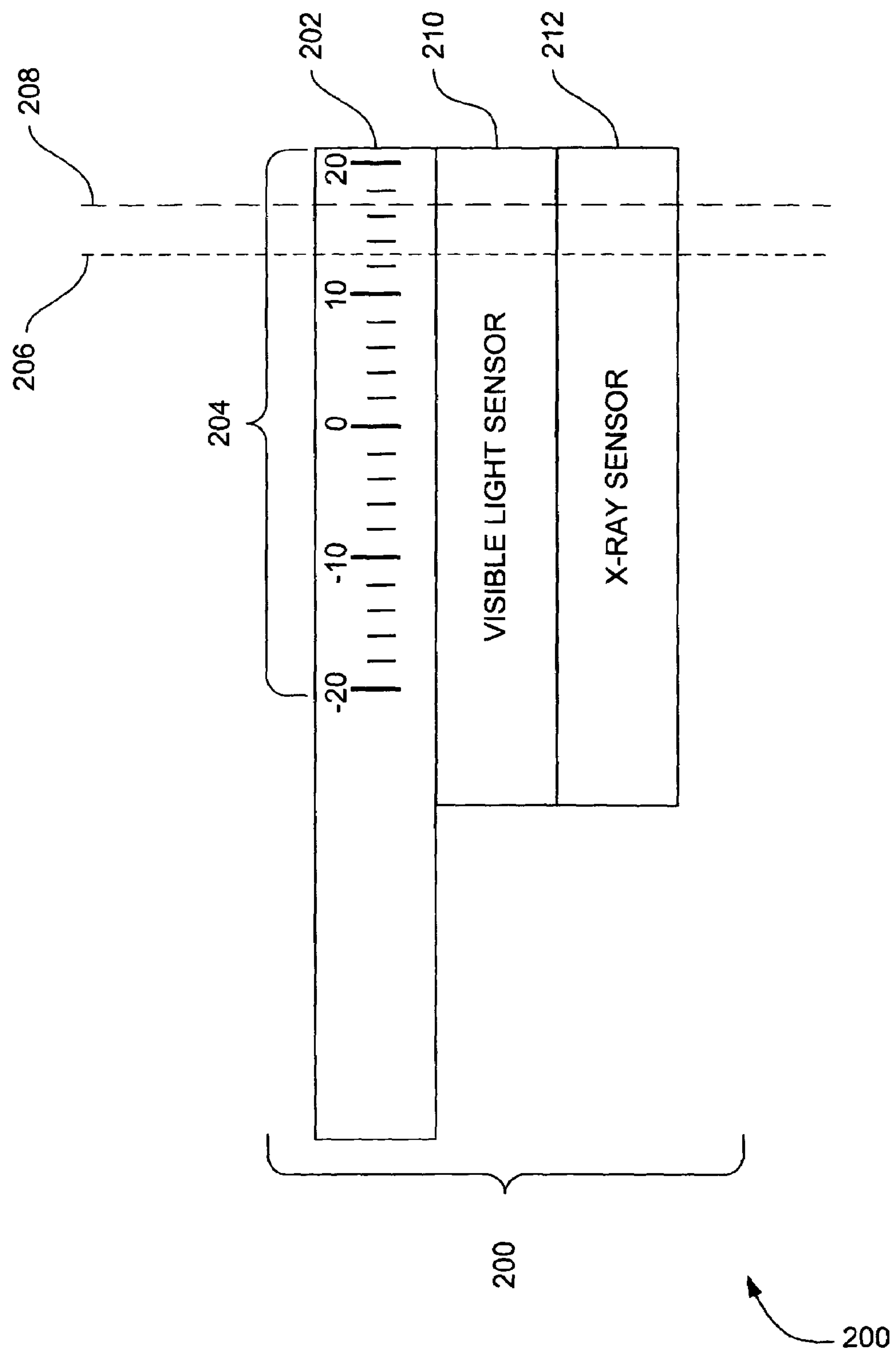
FIG. 2 is a block diagram of an apparatus that includes two sensors of electromagnetic energy of a plurality of wavelengths.

FIG. 2 is a block diagram of an apparatus that includes two sensors of electromagnetic energy of a plurality of wavelengths. Apparatus 200 eliminates the use of film in aligning the visible light field and the X-ray field and increases the speed of aligning those fields in an X-ray imaging system.

Apparatus 200 includes a ruler 202 having radiopaque markings. The ruler 202 having radiopaque markings is not completely transparent to X-rays or other forms of radiation. The ruler 202 having radiopaque markings also includes linear marks 204 that are used to help determine the deviation between an edge 206 of a field of visible light electromagnetic energy and an edge 208 of a field of X-ray electromagnetic energy. The linear marks 204 can be of any measuring system, such as the English system or the metric system. The ruler 202 having radiopaque markings is imaged on a primary receptor to determine a deviation of the X-ray field from an edge of the primary receptor.

Apparatus 200 also includes a sensor 210 of visible light electromagnetic energy mounted, attached or otherwise operably connected to the ruler 202 having radiopaque markings. Attributes of the sensor 210 are modified when visible light electromagnetic energy strikes, thus allowing identification of the edge 206 of where a field of visible light electromagnetic energy begins and ends.

Apparatus 200 also includes a sensor 212 of X-ray electromagnetic energy mounted to the ruler 202 having radiopaque rulings. Attributes of the sensor 212 are modified when X-ray electromagnetic energy strikes, thus allowing identification of the edge 208 of where a field of X-ray electromagnetic energy begins and ends. Sensors 210 and 212 have a high degree of accuracy and obviate the need for the use of film in aligning the X-ray electromagnetic energy field and the visible light field.

The ruler 202 having radiopaque markings also helps correlate the reading from the X-ray sensor to the image in the primary receptor and helps align the edges of the light field within an operating length of the sensors 210 and 212.

Having a sensor 210 of visible light, a sensor of X-ray energy 212 both attached to a ruler 202 having radiopaque markings with linear markings 204 provides a means to detect the edge of a field of visible light and the edge of a field of X-ray energy, which in turn allows the deviation of the two fields to be determined. After the deviation of the two fields is determined by apparatus 200, the source of the X-ray field can be aligned. Thus apparatus 200 solves the need in the art to eliminate the use of film in aligning the visible light field and the X-ray field in an X-ray imaging system. Apparatus 200 solves the need in the art to increase the speed in aligning the visible light field and the X-ray field in an X-ray imaging system.

The system level overview of the operation of an embodiment has been described in this section of the detailed description. While the apparatus 200 is not limited to any particular ruler 202 having radiopaque markings, linear marks 204, edge of a field of visible light 206, edge of an X-ray light field 208, and sensors 210 and 212, for sake of clarity simplified ruler 202 having radiopaque markings, linear marks 204, edge of a field of visible light 206, edge of an X-ray light field 208, sensors 210 and 212 have been described.

Figure 3:
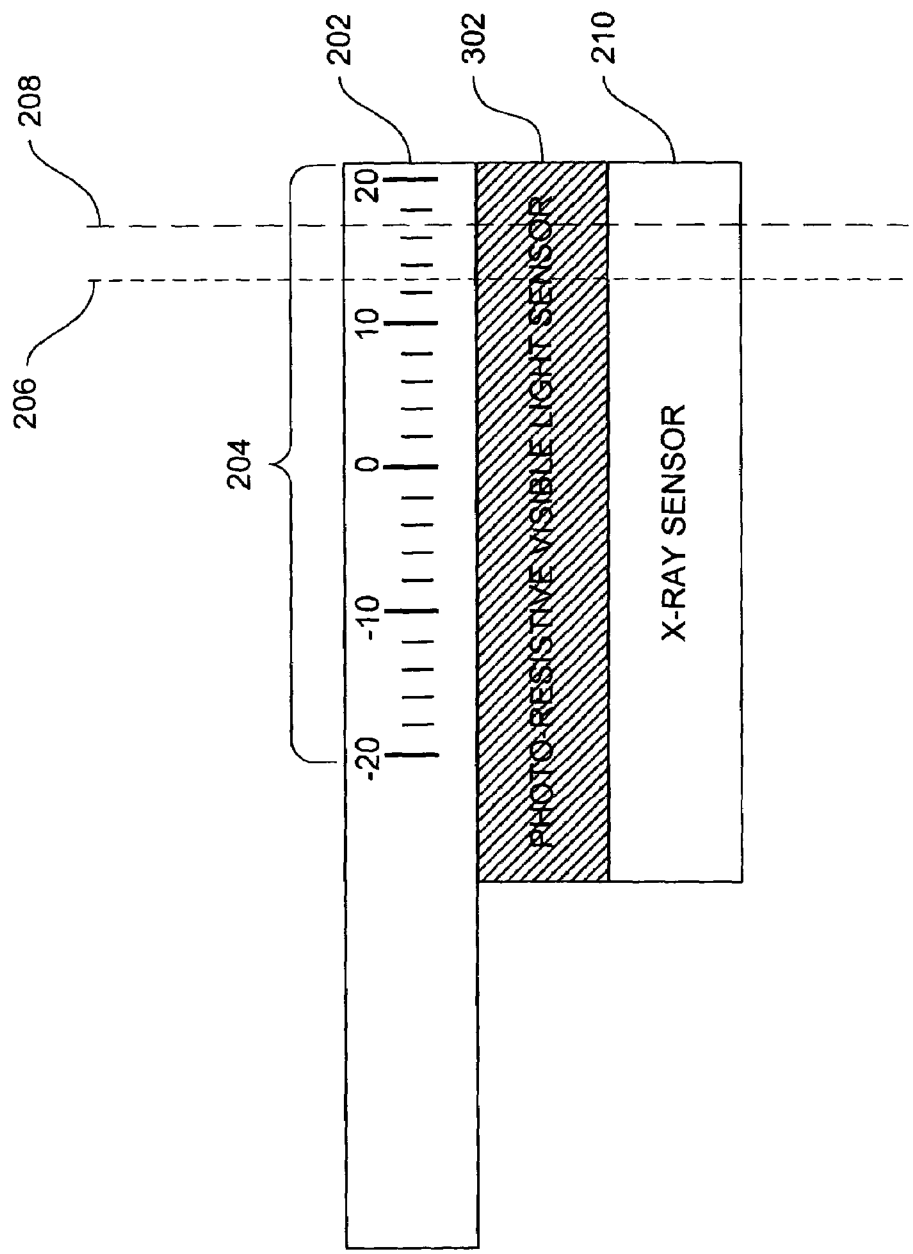
FIG. 3 is a diagram of an apparatus according to an embodiment having a photo-resistive sensor of visible light electromagnetic energy.

FIG. 3 is a diagram of an apparatus 300 according to an embodiment having a photo-resistive sensor of visible light electromagnetic energy. A photo-resistive sensor 302 provides a sensor that is operable to generate one or more electrical signals indicating the extent of the visible light electromagnetic energy. The photo-resistive sensor 302 of visible light electromagnetic energy is operable to be coupled to an electronic device (not shown) to analyze the electrical signals.

In some embodiments, the sensor 210 and sensor 212 are small enough to provide sufficient resolution for an accurate representation of the edge of the respective electromagnetic field. In some embodiments, sensor 210 and sensor 212 are long enough to accommodate an expected upper limit of mis-alignment between the X-ray field and the light field. In one embodiment, each sensor is positioned not more than 1 millimeter apart and covering a length of 40 millimeters.

Figure 4:
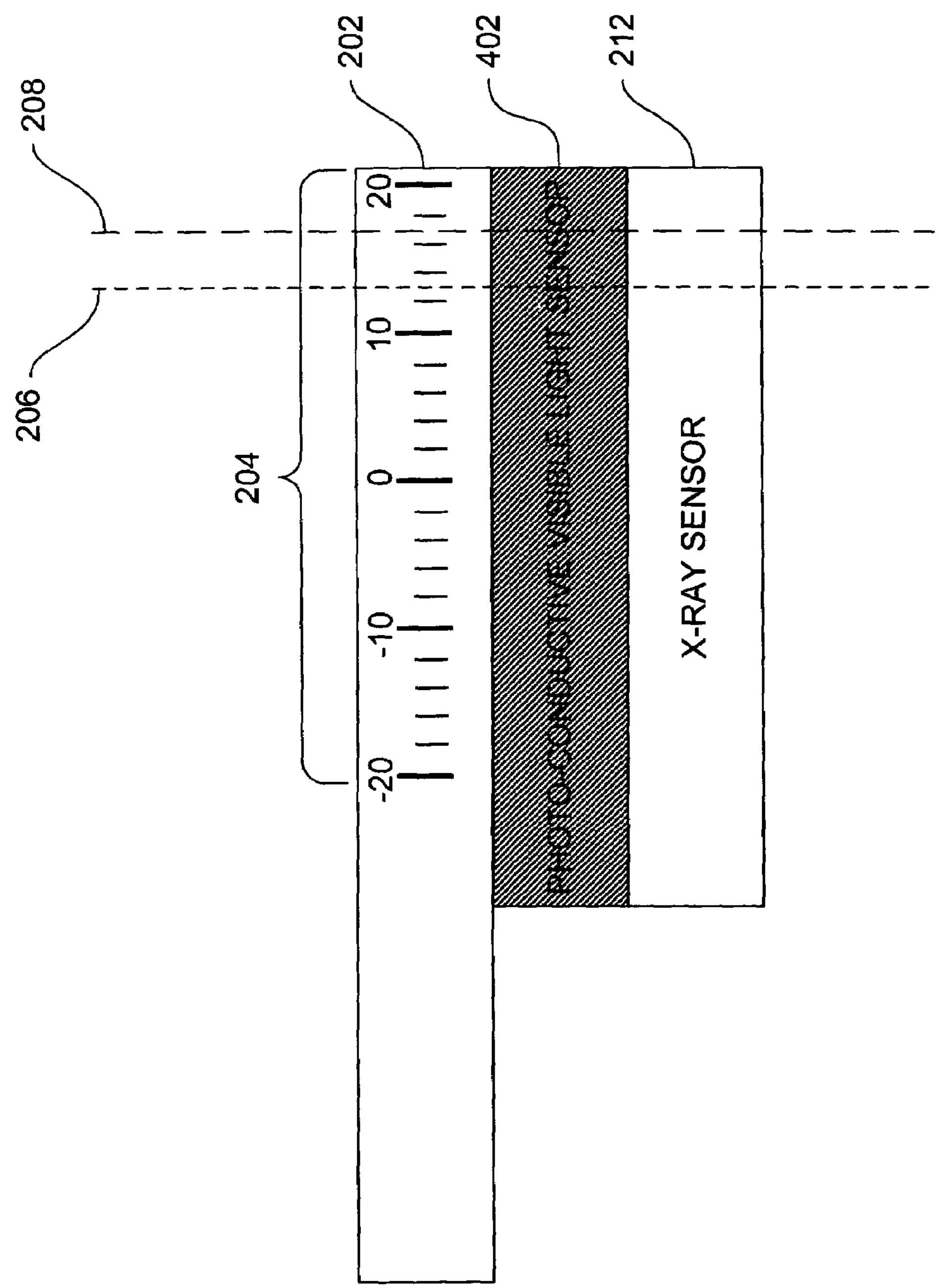
FIG. 4 is a diagram of apparatus according to an embodiment having a photo-conductive array sensor of visible light electromagnetic energy.

FIG. 4 is a diagram of an apparatus 400 according to an embodiment having a photo-conductive array sensor of visible light electromagnetic energy. A linear photo-conductive array sensor 402 provides a sensor that is operable to generate one or more electrical signals indicating the extent of the visible light electromagnetic energy. The linear photo-conductive array sensor 402 of visible light electromagnetic energy is operable to be coupled to an electronic device (not shown) to analyze the electrical signals.

Figure 5:
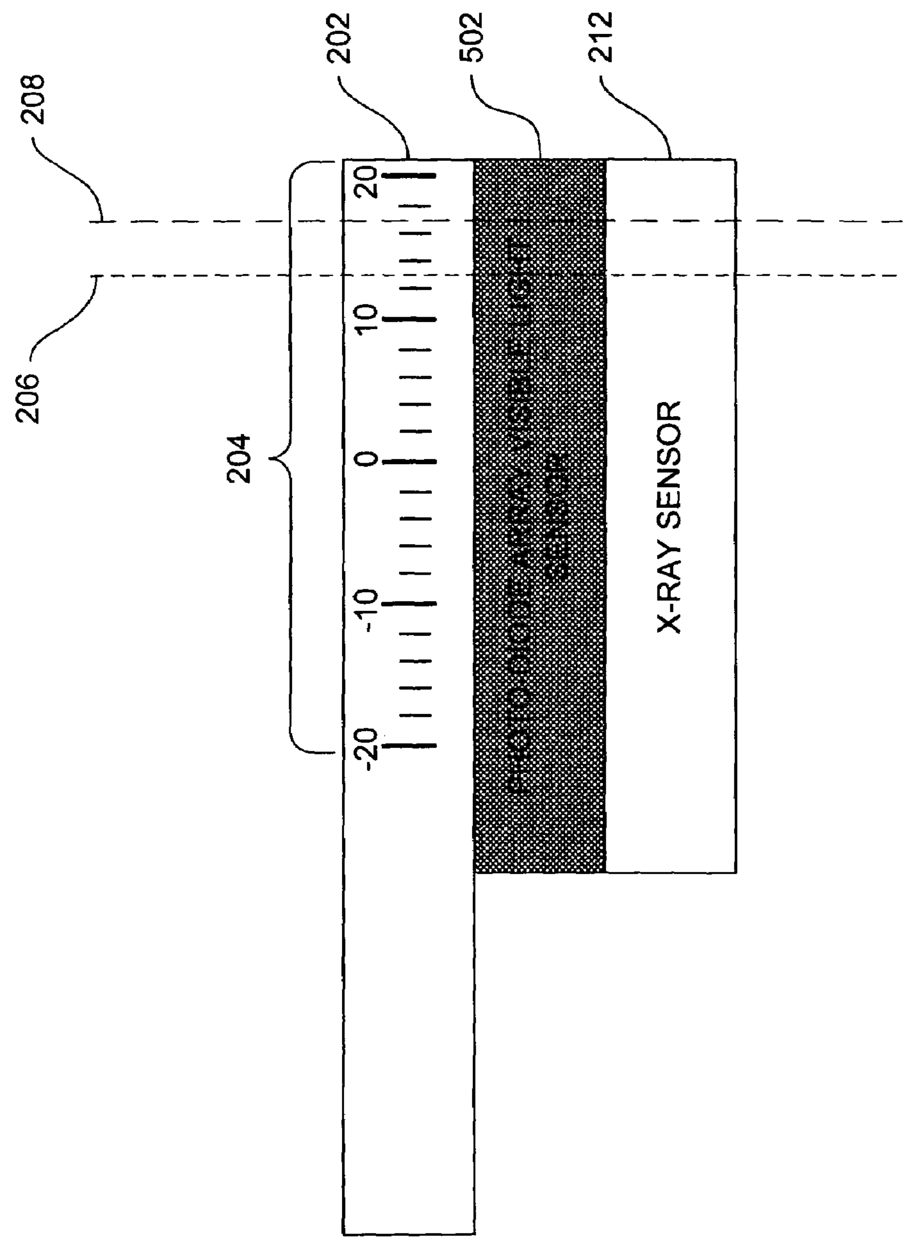
FIG. 5 is a diagram of an apparatus according to an embodiment having a photo-diode array sensor of visible light electromagnetic energy.

FIG. 5 is a diagram of an apparatus 500 according to an embodiment having a photo-diode array sensor of visible light electromagnetic energy. Apparatus 500 is one embodiment of an apparatus 400 in which the photo-conductive array sensor of visible light electromagnetic energy is a photodiode array 502. The photodiode array 502 provides a sensor that is operable to generate one or more electrical signals indicating the extent of the visible light electromagnetic energy. The photodiode array sensor 502 of visible light electromagnetic energy is operable to be coupled to an electronic device (not shown) to analyze the electrical signals.

Figure 6:
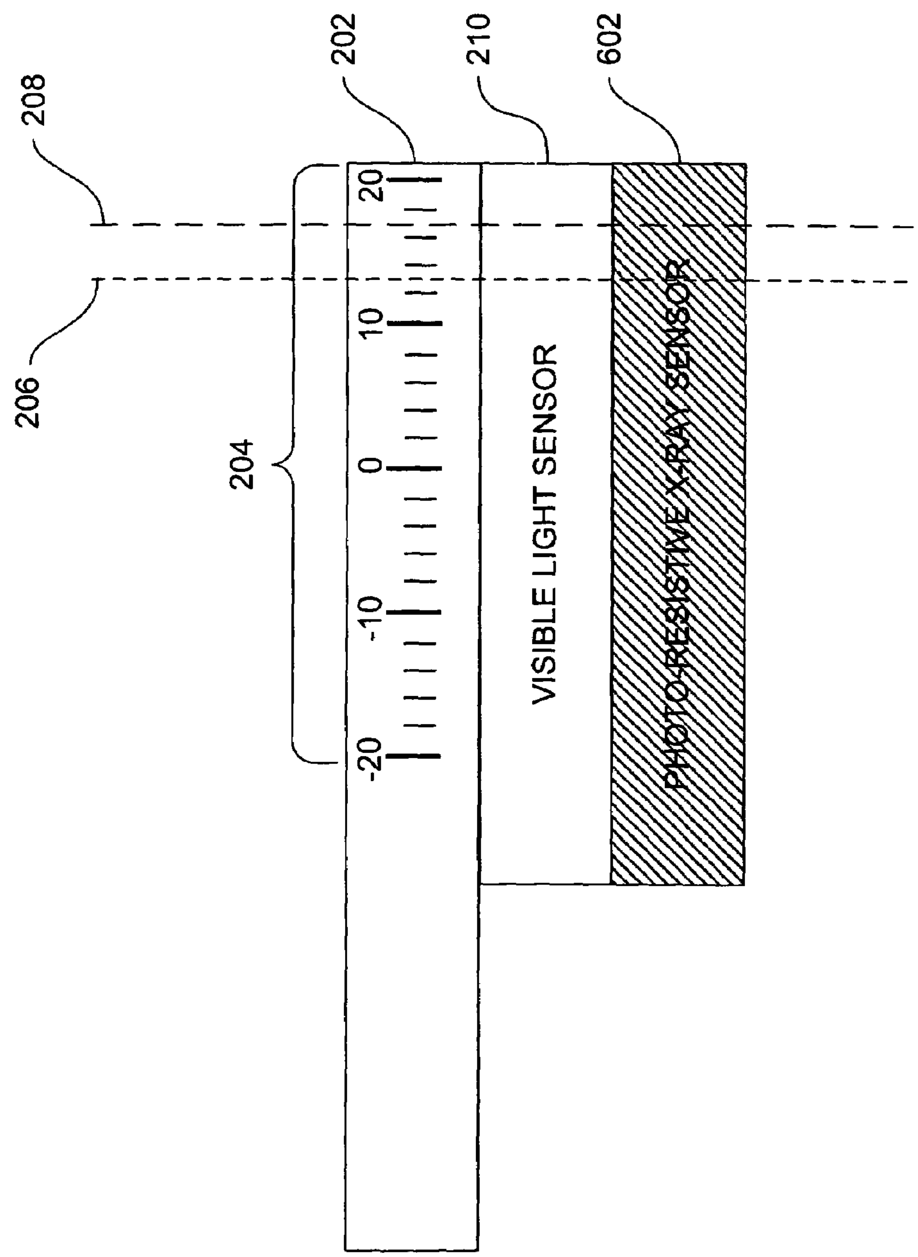
FIG. 6 is a diagram of an apparatus according to an embodiment having a photo-resistive sensor of X-ray electromagnetic energy.

FIG. 6 is a diagram of an apparatus 600 according to an embodiment having a photo-resistive sensor of X-ray electromagnetic energy. A photo-resistive sensor of X-ray electromagnetic energy 602 provides a sensor that is operable to generate one or more electrical signals indicating the extent of the X-ray electromagnetic energy. The photo-resistive sensor 602 of X-ray electromagnetic energy is operable to be coupled to an electronic device (not shown) to analyze the electrical signals.

Figure 7:
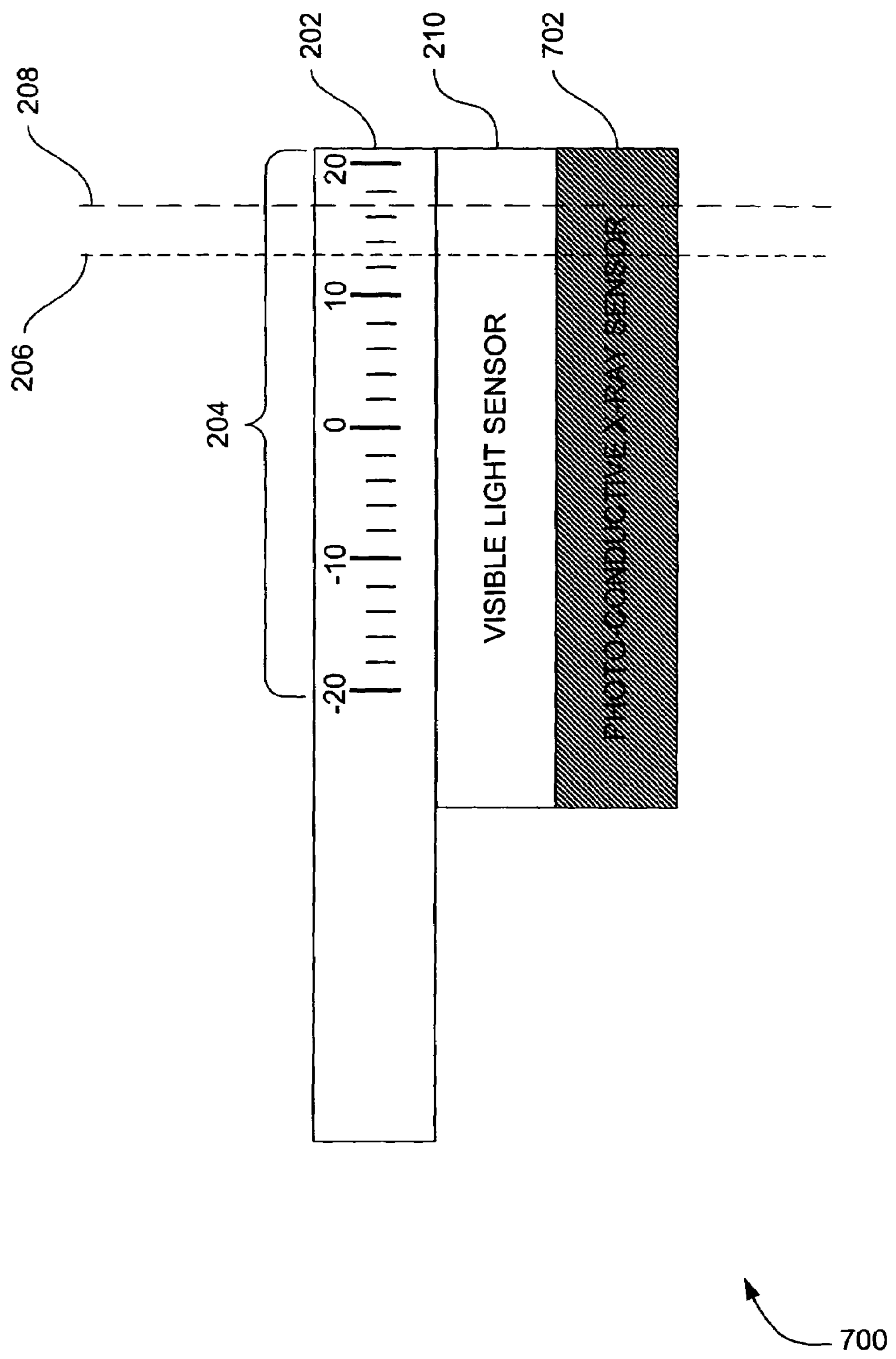
FIG. 7 is a diagram of an apparatus according to an embodiment having a photo-conductive array sensor of X-ray electromagnetic energy with a layer of scintillating material.

FIG. 7 is a diagram of an apparatus 700 according to an embodiment having a photo-conductive array sensor of X-ray electromagnetic energy with a layer of scintillating material.

A photo-conductive array sensor 702 provides a sensor that is operable to generate one or more electrical signals indicating the extent of the X-ray electromagnetic energy. The photo-conductive array sensor 702 of X-ray electromagnetic energy is operable to be coupled to an electronic device (not shown) to analyze the electrical signals. In some embodiments, to enhance sensitivity of the sensor to the X-ray field, an outside layer of scintillating material is positioned on the top of the photo-conductive array sensor 702.

Figure 8:
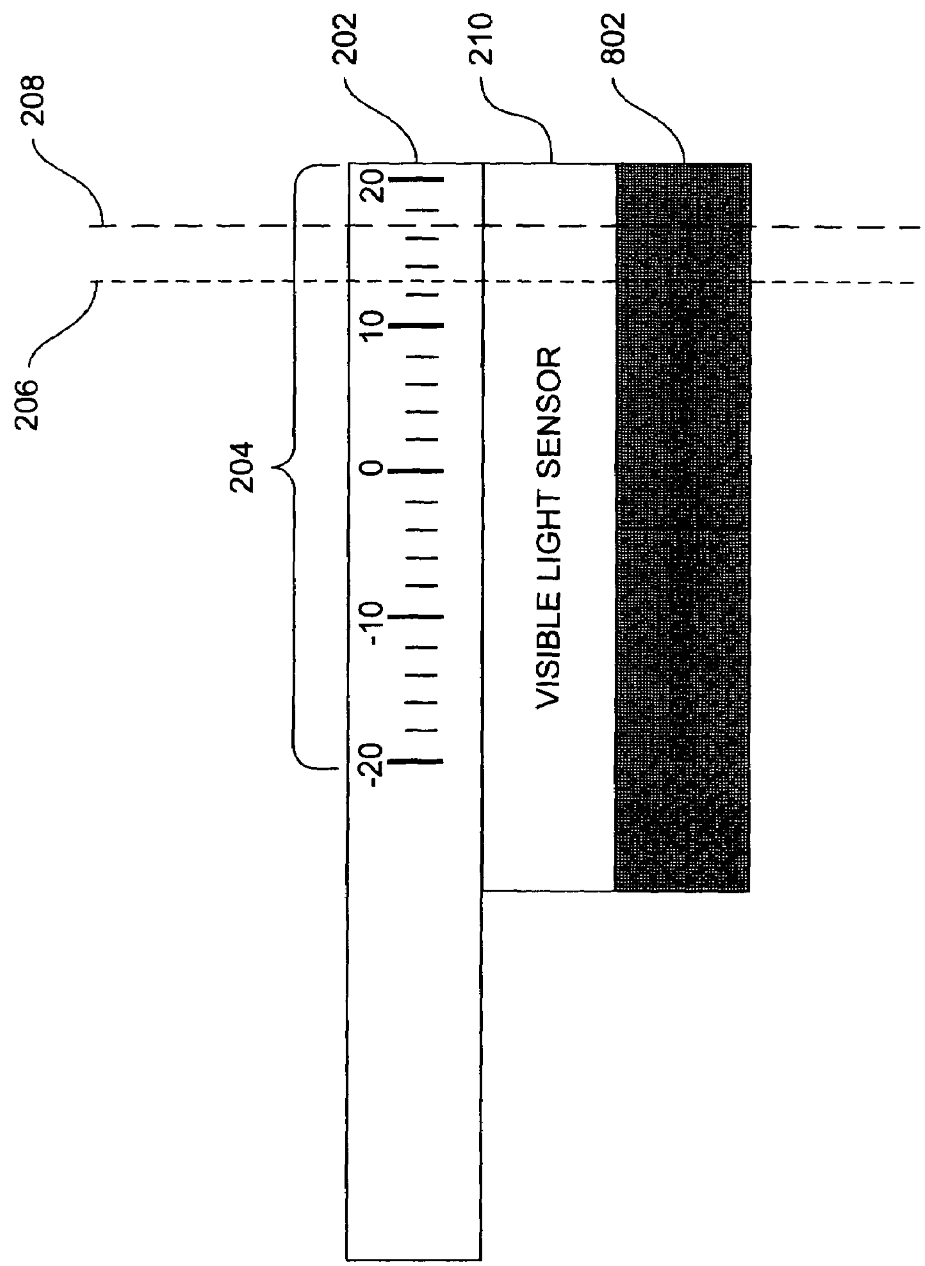
FIG. 8 is a diagram of an apparatus according to an embodiment having a photodiode array sensor of X-ray electromagnetic energy.

FIG. 8 is a diagram of an apparatus 800 according to an embodiment having a photodiode array sensor of X-ray electromagnetic energy. Apparatus 800 is one embodiment of an apparatus 700 in which the photo-conductive array sensor of X-ray electromagnetic energy is a photodiode array 802. The photodiode array sensor 802 provides a sensor that is operable to generate one or more electrical signals indicating the extent of the X-ray electromagnetic energy. The photodiode array 802 of X-ray electromagnetic energy is operable to be coupled to an electronic device (not shown) to analyze the electrical signals.

Figure 9:
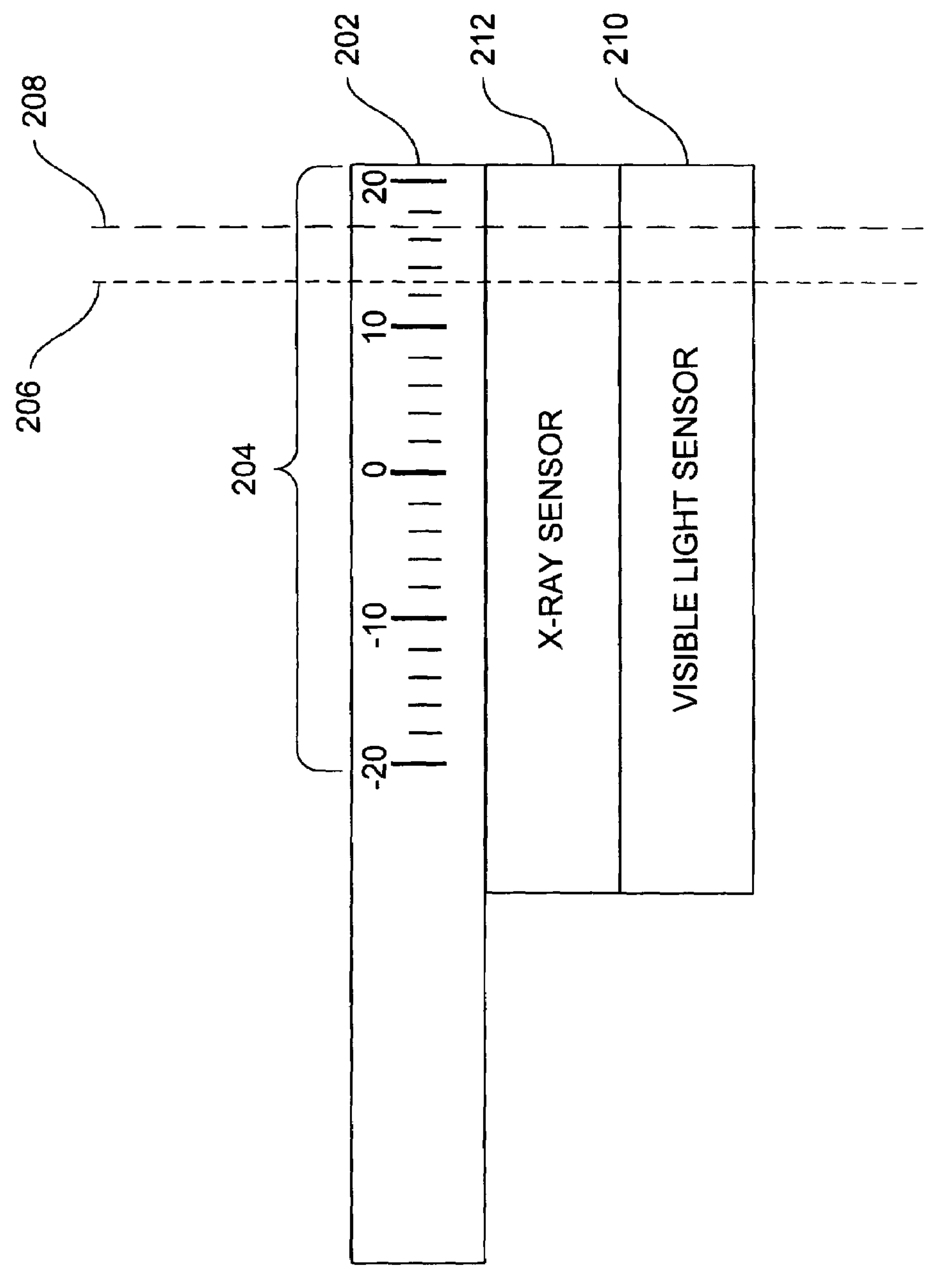
FIG. 9 is a diagram of an apparatus according to an embodiment in which the sensor of X-ray electromagnetic energy is mounted directly to the ruler having radiopaque markings.

FIG. 9 is a diagram of an apparatus 900 according to an embodiment in which the sensor of X-ray electromagnetic energy is mounted directly to the ruler 202 having radiopaque markings. In FIG. 9, the sensor 212 of X-ray electromagnetic energy is mounted directly to the ruler 202 having radiopaque markings. The ruler 202 having radiopaque markings and sensors 210 and 212 are in the same plane or at known planes.

Figure 10:
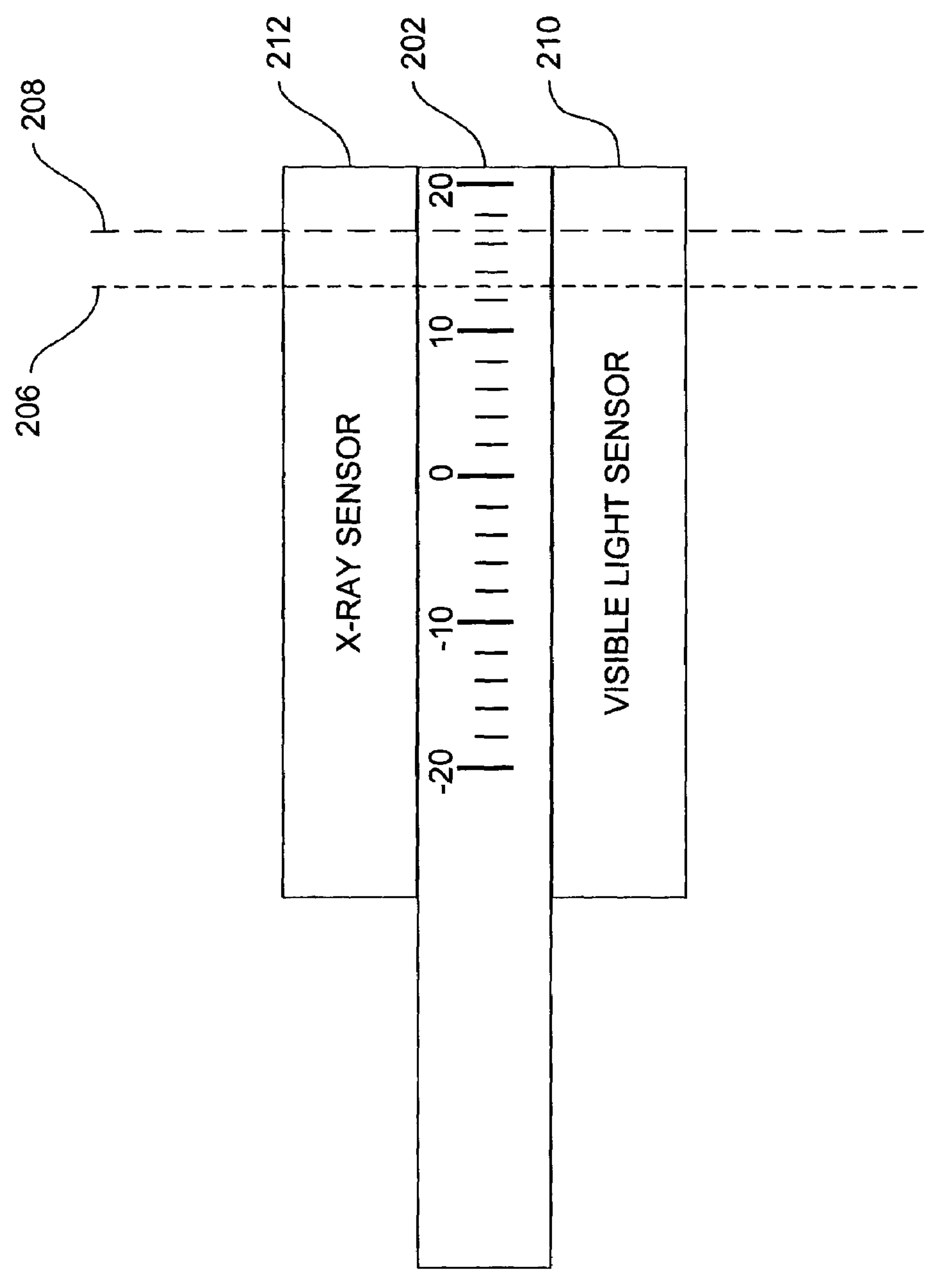
FIG. 10 is a diagram of an apparatus according to an embodiment in which both sensors are mounted directly to the ruler having radiopaque markings.

FIG. 10 is a diagram of an apparatus 1000 according to an embodiment in which both sensors are mounted directly to the ruler 202 having radiopaque markings. In FIG. 10, both the sensor 210 of visible light electromagnetic energy and the sensor 212 of X-ray electromagnetic energy are mounted directly to the ruler 202 having radiopaque markings. The ruler 202 having radiopaque markings and sensors 210 and 212 are in the same plane or at known planes.

Figure 11:
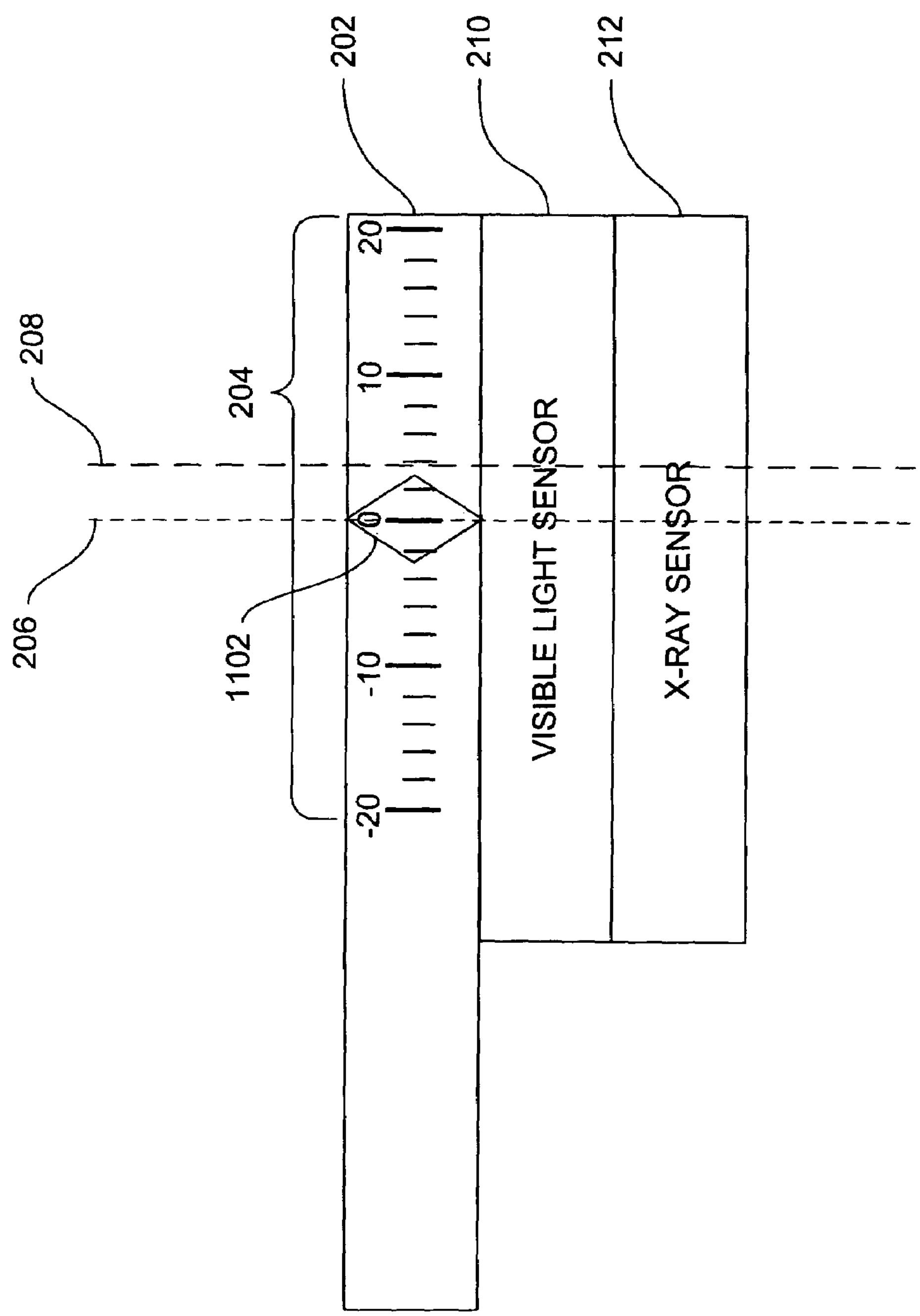
FIG. 11 is a diagram of an apparatus according to an embodiment in which a ruler having radiopaque markings includes a visible light alignment mark.

FIG. 11 is a diagram of an apparatus 1100 according to an embodiment in which a ruler 202 having radiopaque markings includes a visible light alignment mark. The visible light alignment mark 1102 allows the apparatus 1100 to be aligned with the edge of the visible light at a point on the ruler 202 having radiopaque markings where it is convenient to count on the ruler 202 having radiopaque markings the distance between the edge 206 of a field of visible light electromagnetic energy and the edge 208 of a field of X-ray electromagnetic energy.

Figure 12:
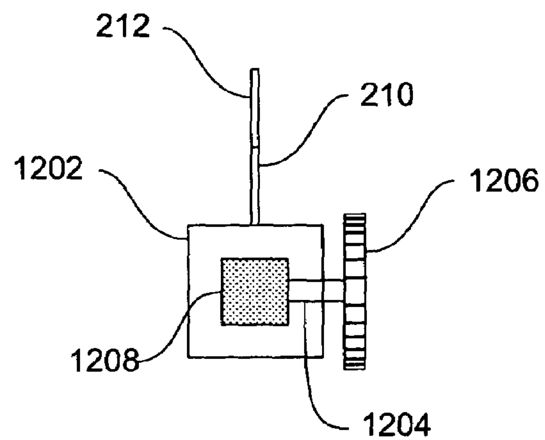
FIG. 12 is a diagram of an apparatus according to an embodiment in which a sensor carriage is moveably attached to an adjustment track.

FIG. 12 is a diagram of an apparatus 1200 according to an embodiment in which a sensor carriage is moveably attached to an adjustment track.

Apparatus 1200 includes a sensor carriage 1202, the sensor carriage 1202 comprises the ruler having radiopaque markings (not shown in FIG. 12). The sensor carriage 1202 further comprises a tubular shaped body, such as the square tubular shaped body shown in FIG. 12, a round tubular-shaped body, or tubular shaped body having another geometry known to those of ordinary skill in the art. The body of the sensor carriage 1202 has a threaded hole through one side, through which extends a threaded position locking shaft 1204. A position locking knob 1206 is fixed to an end of the position locking shaft 1204 that is outside of the tubular shaped body of the sensor carriage 1202.

Figure 13:
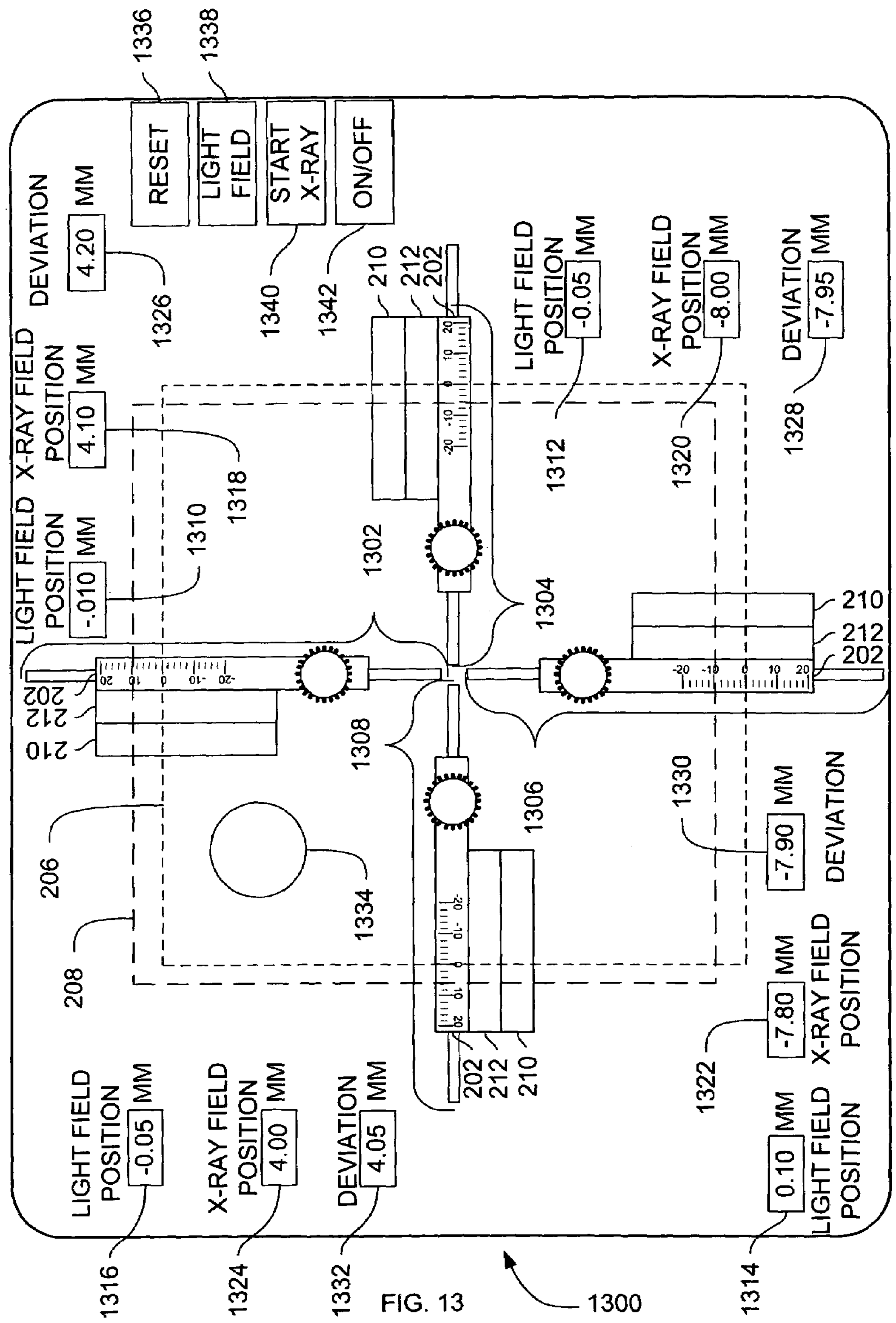
FIG. 13 is a diagram of a front face of an alignment test tool according to an embodiment in which both sensors and displays are packaged.

FIG. 13 is a diagram of a front face of an alignment test tool 1300 according to an embodiment in which both sensors and displays are packaged. Alignment test tool 1300 is also known as an image receptor alignment test tool.

Alignment test tool 1300 includes four sensor carriages 1302, 1304, 1306 and 1308. Each sensor carriage includes an adjustment track, an adjustment tuning knob, a ruler 202 having radiopaque markings and linear marks, a sensor 210 of visible light electromagnetic energy mounted and a sensor 212 of X-ray electromagnetic energy mounted to the ruler 202 having radiopaque markings and linear marks.

Figure 24:
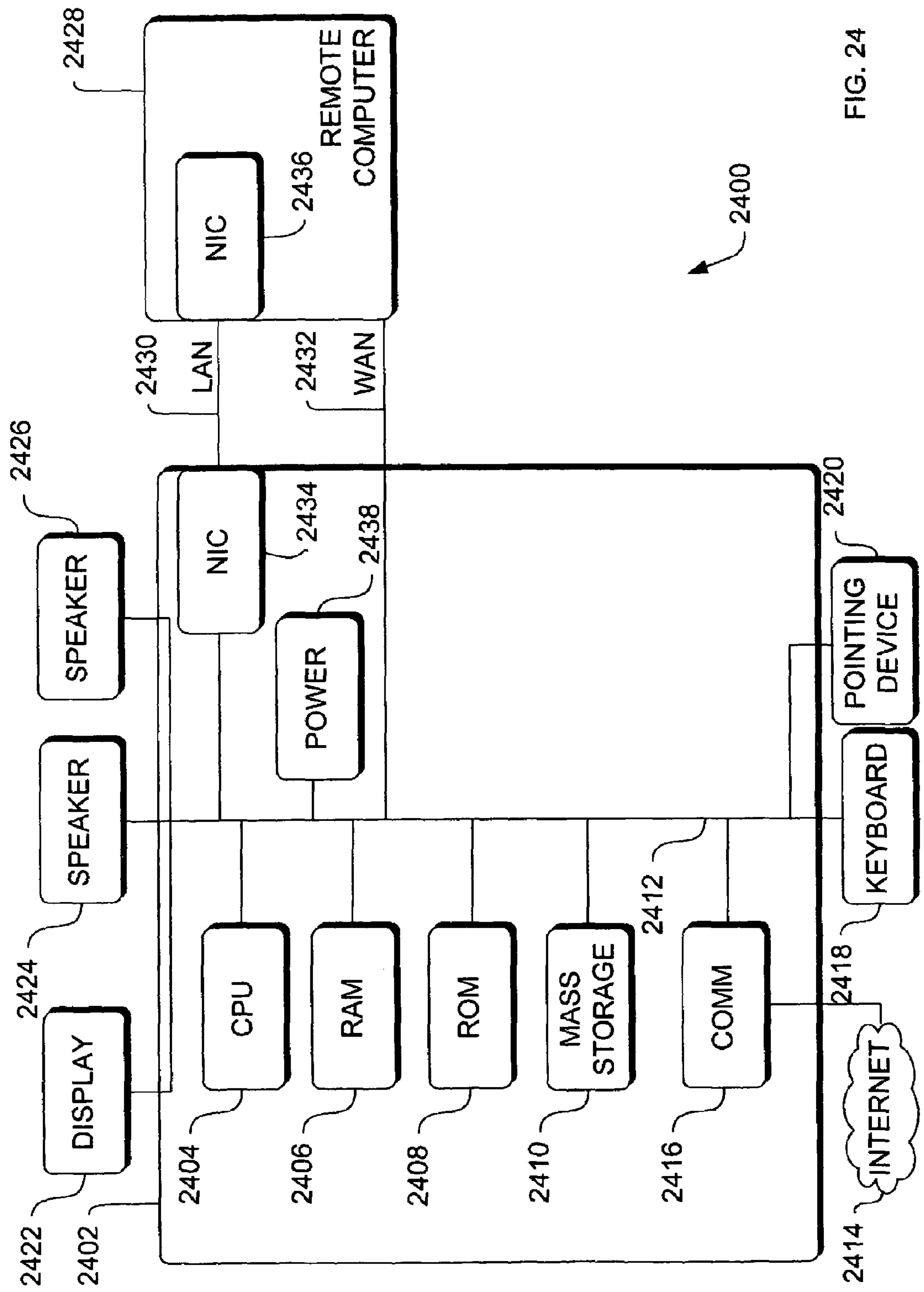
FIG. 24 is a block diagram of the hardware and operating environment in which different embodiments can be practiced.

The alignment test tool 1300 also includes a controller (not shown) or computer such as computer 2400 in FIG. 24 that receives electrical signals from the sensors 210 of visible light electromagnetic energy indicating the extent of the visible light electromagnetic energy 206. The controller accordingly displays information describing the position of the light field on the alignment test tool 1300. The visible light position information is displayed on visual displays such as light-emitting-diode displays or liquid-crystal-diode displays 1310, 1312, 1314 and 1316 mounted on the front face of the alignment test tool 1300. In some alternative embodiments, one display (not shown) is operatively coupled to the controller that displays information describing the position of the light field on the alignment test tool 1300 along all four edges of the light field.

The controller also receives electrical signals from the sensors 212 of X-ray electromagnetic energy indicating the extent of the X-ray electromagnetic energy. The controller accordingly displays information describing the position of the X-ray field on the alignment test tool 1300. The X-ray position information is displayed on visual displays 1318, 1320, 1322 and 1324 mounted on the front face of the alignment test tool 1300. In some alternative embodiments, one display (not shown) is operatively coupled to the controller that displays information describing the position of the X-ray field on the alignment test tool 1300 along all four edges of the X-ray field.

A deviation between the X-ray position information and the visible light position information of each sensor carriage is displayed in visual displays 1326, 1328, 1330 and 1332. Having a visual real time display of the deviation of the visible light and the X-ray fields on all four outer perimeters provides an alignment test tool 1300 that is used to actively monitor the deviations while the X-ray field is aligned with the visible light field. The displays 1310, 1312, 1314, 1316, 1318, 1320, 1322, 1324, 1326, 1328, 1330 and 1332 are collectively known as position and deviation read outs. In some alternative embodiments, one display (not shown) is operatively coupled to the controller that displays information describing the position of the X-ray field and the light field on the alignment test tool 1300 along all four edges of the X-ray field and the light field.

In some embodiments, the alignment test tool 1300 also includes a scale factor object 1334 on the face of the alignment test tool 1300 of a known size, such as a diameter of 25 millimeters in FIG. 13. The scale factor object 1334 attentuates electromagnetic energy from a divergent beam. The divergence of the beam causes projections of the scale factor object 1334 to be different sizes in different planes disposed along the axis of the beam. The deviation between the size of the scale factor object 1334 as imaged in one of these planes and the actual size of the scale factor object 1334 is used to scale the deviations displayed in visual displays 1326, 1328, 1330 and 1332 to deviations in the plane of interest, for example, the plane of the primary receptor.

In another embodiment, the scale factor object is a special purpose radiopaque disk or ring incorporated onto the face of the alignment test tool 1300 to facilitate the determination of this scale factor. Means are also incorporated into the controller of the alignment test tool 1300, for example, a numerical keypad, to input this scale factor to the controller to permit conversion of the displayed values of edge position and deviation with respect to a specific reference plane.

In some embodiments, the alignment test tool 1300 also includes control buttons such as a reset button 1336 that resets the controller and all other electrical circuitry, a light field button 1338 that signals the alignment test tool 1300 to make a determination of light field position, an X-ray button 1340 that signals the alignment test tool 1300 to make a determination of X-ray field position, and a ON/OFF button 1342 that controls power to the alignment test tool 1300. In some embodiments the tool automatically detects the presence of the visible light field to perform a visible light field measurement. In some embodiments, the tool automatically detects the presence of the X-ray field to perform an X-ray field measurement.

The alignment test tool 1300 can be used to determine a deviation between the X-ray field 208 and visible light field 206. In such an application, the alignment test tool 1300 is placed between the source of the X-ray field 208 and the visible light field 206 and an X-ray receptor. The alignment test tool 1300 will display the deviations and the X-ray field 208 and visible light field 206 can be adjusted until the X-ray field 208 and visible light field 206 are aligned in reference to the display of the deviations.

Thus, through use of the electronic display of the deviation, alignment test tool 1300 solves the need in the art to reduce the operating cost of X-ray imaging systems by decreasing the amount of time aligning the visible light field and the X-ray field in an X-ray imaging system.

Figure 14:
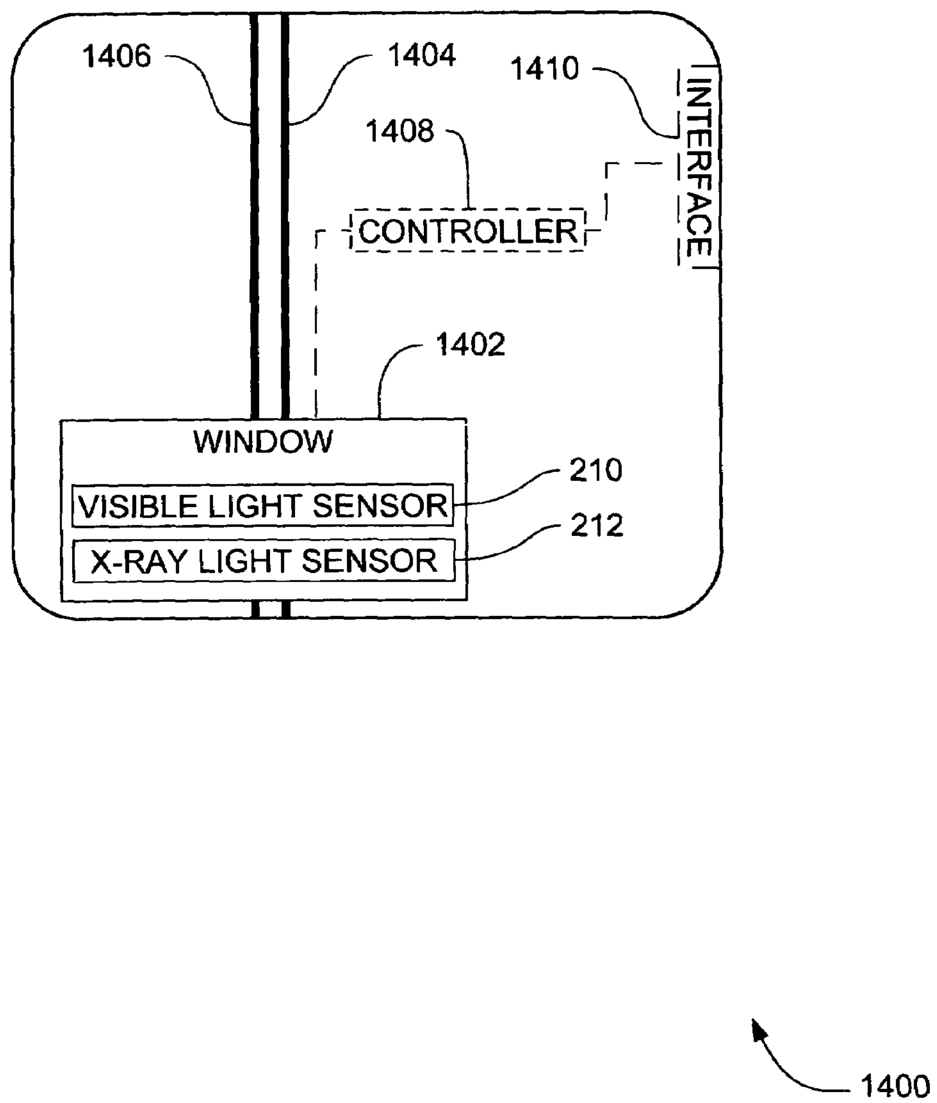
FIG. 14 is a diagram of an alignment test tool sensor unit according to an embodiment in which sensors are packaged.

FIG. 14 is a diagram of an alignment test tool sensor unit 1400 according to an embodiment in which sensors are packaged. The alignment test tool sensor unit 1400 includes a sensor 210 of visible light electromagnetic energy and a sensor 212 of X-ray electromagnetic energy mounted within the alignment test tool sensor unit 1400 behind a window 1402 that is transparent to visible light and X-ray electromagnetic energy.

In some embodiments, the alignment test tool sensor unit 1400 also includes guides 1404 and 1406 for light field alignment. In operation, the alignment test tool sensor unit 1400 is positioned so that the edge of the light field is within the two guides 1404 and 1406.

A controller 1408 operably coupled to the sensors 210 and 212, receives electrical signals from the sensors 210 and 212 indicating the extent of the X-ray and visible electromagnetic energy. The controller 1408 accordingly determines where the edge of each field is projected or falls upon each of the sensors, and the controller 1408 transmits information describing where the edges project or fall. The transmission is performed through a conventional computer interface 1410 such as a serial, a parallel or a wireless computer interface that is well known to those of skill in the art.

In some embodiments, the alignment test tool sensor unit 1400 also includes a reference mark line (not shown) that circumscribes the alignment test tool sensor unit 1400 around the sides. The reference mark line indicates the plane of the sensors 210 and 212 which facilitates scaling measurements to an image receptor plane.

Thus, through use of the electronic detection of the deviation, alignment test tool sensor unit 1400 solves the need in the art to reduce the operating cost of X-ray imaging systems by decreasing the amount of time aligning the visible light field and the X-ray field in an X-ray imaging system.

Figure 15:
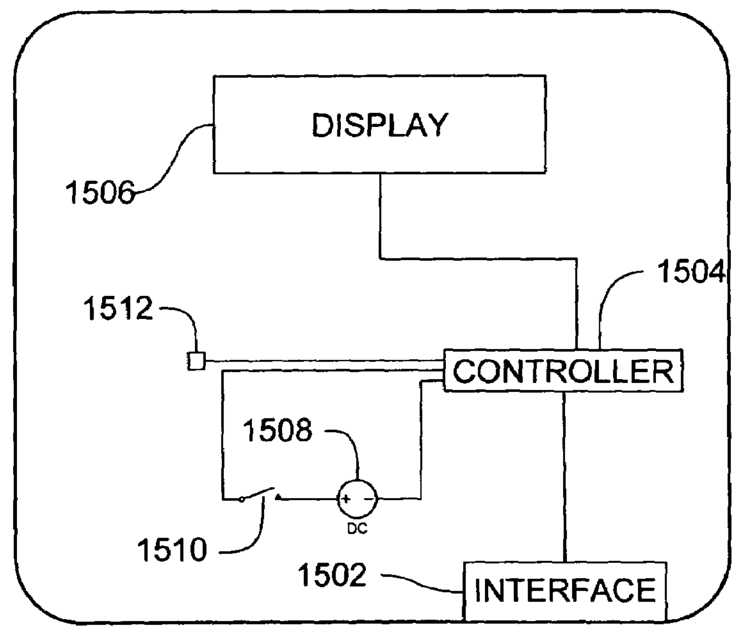
FIG. 15 is a diagram of an alignment test tool readout unit according to an embodiment in which displays are packaged.

FIG. 15 is a diagram of an alignment test tool readout unit 1500 according to an embodiment in which displays are packaged. The alignment test tool readout unit 1500 includes a conventional computer interface 1502, such as a serial, a parallel, or a wireless interface that is well known to those of skill in the art. In some embodiments, the interface 1502 receives electrical signals from the alignment test tool sensor unit 1400 indicating the extent of X-ray and visible electromagnetic energy.

A controller 1504 receives the electrical signals from the interface 1502 and transmits information describing the position, deviation and the alignment of the X-ray and visible electromagnetic energy fields to a read-out display 1506.

A power supply 1508 and a switch 1510 also control the power states of the alignment test tool readout unit 1500. In some embodiments, a read-out selector button 1512 is also implemented.

The read-out display 1506 also displays status information, such as "ready" indicating that the power is switched on, and the unit is ready to operate, and "reading" indicating that the selector button has been pushed and the unit is reading a light field position.

Thus, through use of the electronic display of the deviation by read-out display 1506, alignment test tool readout unit 1500 solves the need in the art to reduce the operating cost of X-ray imaging systems by decreasing the amount of time aligning the visible light field and the X-ray field in an X-ray imaging system.

Methods of an Embodiment

In the previous section, apparatus for the operation of an embodiment was described. In this section, the particular methods of such embodiments are described by reference to a series of flowcharts. The methods eliminate the use of film in aligning a visible light field and an X-ray field and increases the speed of aligning those fields in an X-ray imaging system.

Figure 16:
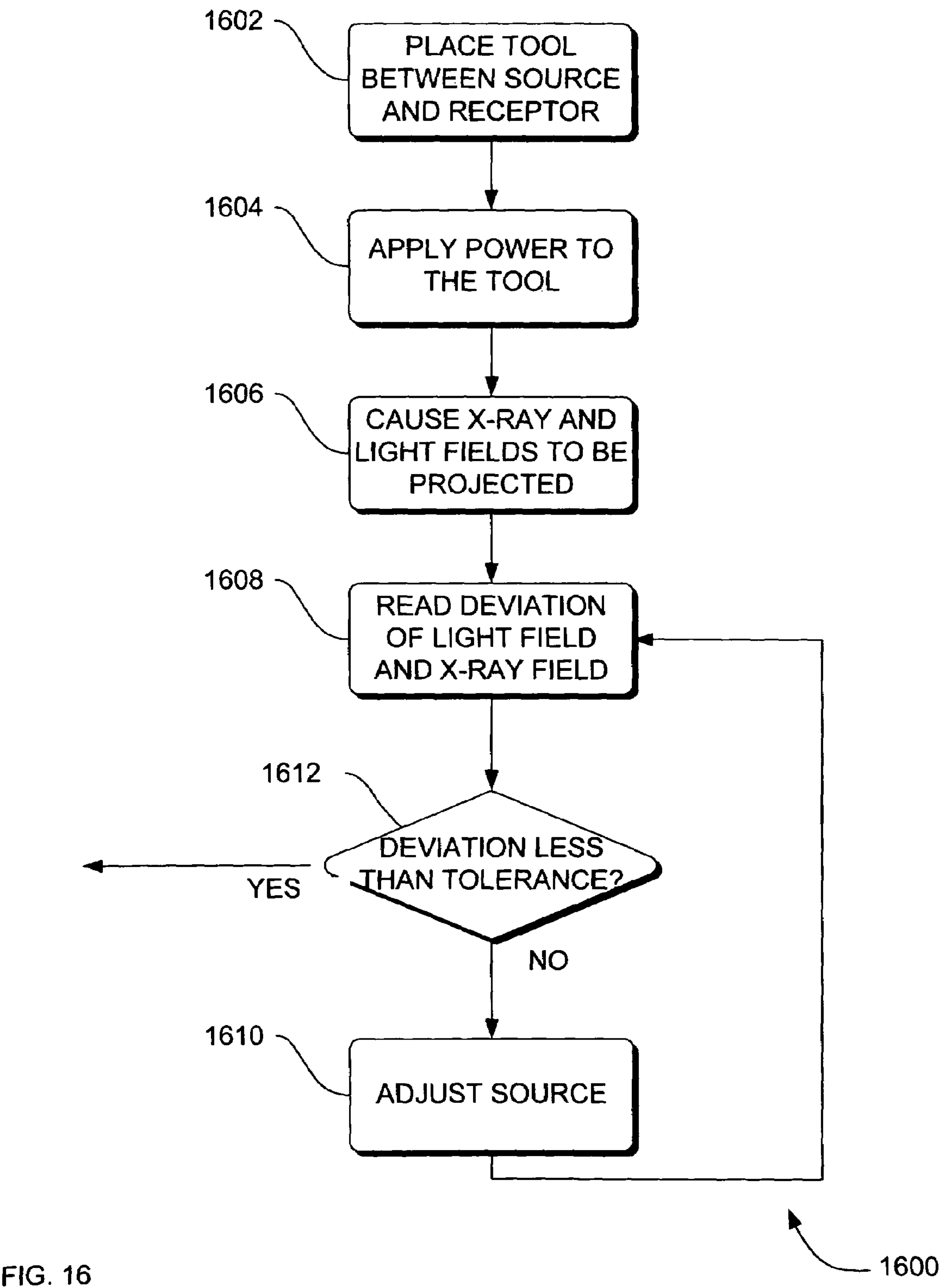
FIG. 16 is a flowchart of a method of aligning an X-ray field with a visible light field of an X-ray medical imaging device according to an embodiment.

FIG. 16 is a flowchart of a method 1600 of aligning an X-ray field with a visible light field of an X-ray medical imaging device according to an embodiment. In some embodiments, method 1600 is performed by a human.

The source is the source of the X-ray field and the source of the visible light field. The electronic alignment test tool comprises sensors of the X-ray field and the visible light field. Examples of the electronic alignment test tool include 108 in system 100, apparatus 200, 300, 400, 500, 600, 700, 800, 900, 1000, 1100, alignment test tool 1300, alignment test tool sensor unit 1400 and alignment test tool readout unit 1500.

Method 1600 includes placing 1602 the electronic alignment test tool between a source and a primary receptor. In some embodiments the alignment test tool is placed in a plane perpendicular to the central ray of the X-ray tube for a conventional radiography system or perpendicular to the ray along the chest wall edge of the X-ray beam for a mammography system. The alignment test tool is oriented to align each edge of the board parallel to a corresponding edge of the X-ray field.

Method 1600 also includes applying 1604 power to the electronic alignment test tool and causing 1606 the source to project the X-ray field and the visible light field. Actions 1602, 1604 and 1606 can be performed in any order with respect to each other.

Thereafter, method 1600 includes reading 1608 at least one deviation of the X-ray field and the visible light field from the electronic alignment test tool. In some embodiments, the deviation is read 1608 from alignment test tool readout unit 1500.

Subsequently, method 1600 includes adjusting 1610 the source so that the X-ray field and the visible light field are aligned in reference to the at least one deviation if a determination 1612 that the deviation is not less than the tolerance is made.

Method 1600 allows the positions, and thus any deviation of the electromagnetic fields to be detected quickly which in turn decreases the amount of time measuring deviations, which in turn increases the speed of aligning the electromagnetic fields in an X-ray imaging system, which in turn solves the need in the art to reduce the operating cost of X-ray imaging systems. In addition, the use of the electronic alignment test tool solves the need in the art to eliminate the use of film in aligning the visible light field and the X-ray field in an X-ray imaging system.

Figure 17:
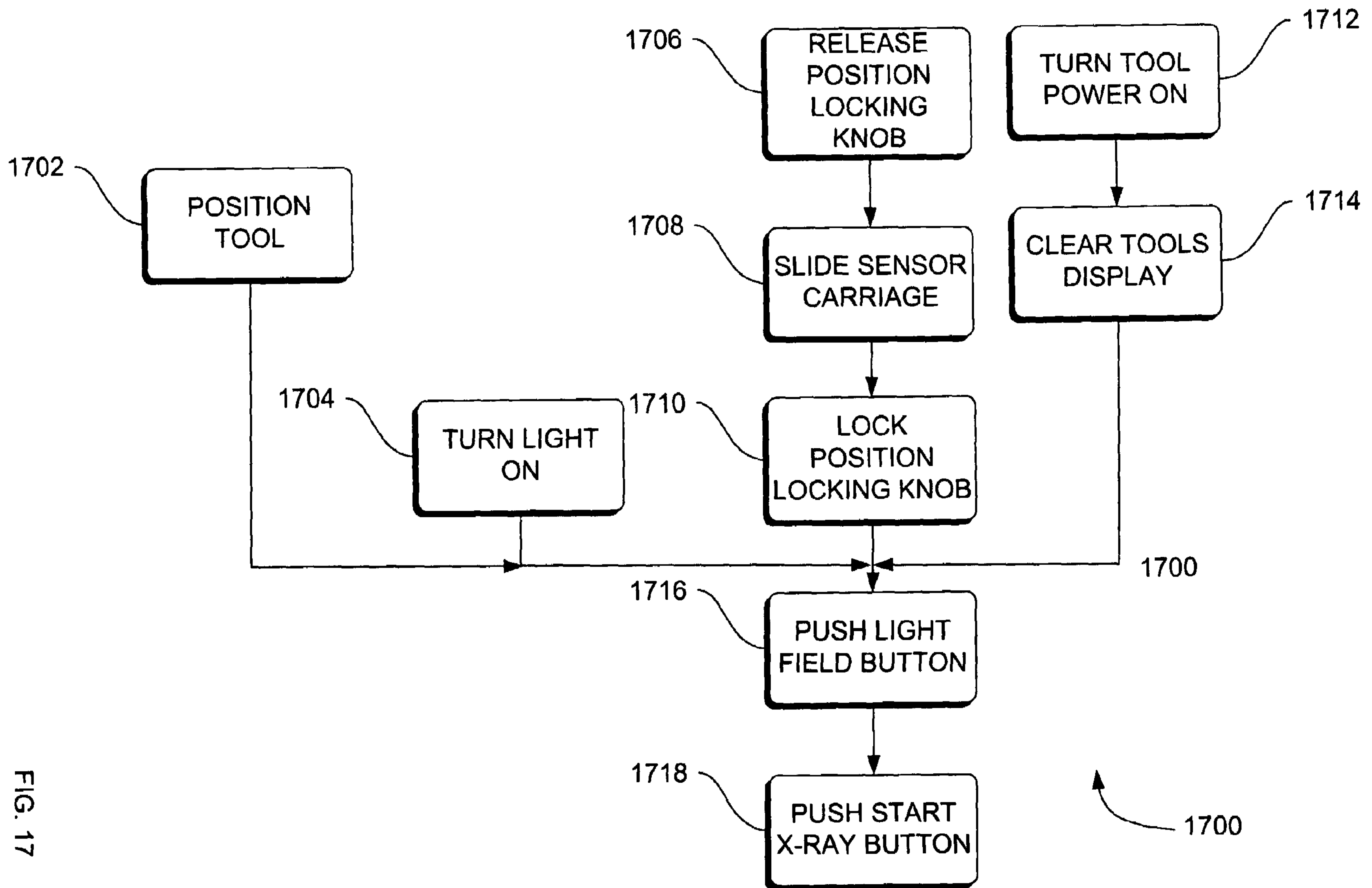
FIG. 17 is a flowchart of a method of aligning an X-ray field with a visible light field of an X-ray medical imaging device according to an embodiment.

FIG. 17 is a flowchart of a method 1700 of aligning an X-ray field with a visible light field of an X-ray medical imaging device according to an embodiment. In some embodiments, method 1700 is performed by a human using the alignment test tool 1300 in FIG. 13.

Method 1700 includes positioning 1702 an alignment test tool between a source and an X-ray receptor, as in placing 1602 in FIG. 16. Method 1700 includes turning 1704 on a localizing light and releasing 1706 the position locking knob of the sensor carriage.

Method 1700 also includes sliding 1708 the sensor carriage along the adjustment track in a direction perpendicular to the edge of the light field to be analyzed until the edge of the light field is aligned with the light field alignment mark on the sensor carriage.

Method 1700 also includes locking 1710 the position locking knob to hold the position of the sensor carriage relative to the edge of the light field.

The above three actions are repeated for all remaining sensor carriages.

Method 1700 also includes turning on 1712 the power to the alignment test tool 1300 using the On/Off button and then pushing 1714 the Reset button to clear the displays.

Method 1700 also includes pushing 1716 the Light Field button to make the measurement of the light field position along each edge to ensure that the X-ray field localizing light is still illuminated. The position detected by the alignment test tool 1300 is displayed in the Light Field Position display for each edge of the field.

Method 1700 also includes pushing 1718 the Start X-ray button to direct the alignment test tool 1300 to be prepared to detect the start of an X-ray exposure.

The alignment test tool 1300 reads the signals from each X-ray sensor to measure the position of the X-ray field along each edge. The position detected by the alignment test tool 1300 is displayed in the X-ray Field Position display for each edge of the field. The deviation between the detected edges of the light field and X-ray field is calculated by the alignment test tool 1300 for each edge and shown in the Light-X-ray Field Deviation display. Then the determination of the deviation between the edges of the X-ray field and the primary image receptor is determined by the alignment test tool 1300.

The radiopaque markings on the ruler 202 can be read directly in the image acquired on the primary receptor to determine the location of the edge of the detector with respect to the light field alignment mark on the sensor carriage. This provides a measure of the location of the edge of the detector referenced to the plane of the rulers having radiopaque markings of the alignment test tool 1300. The determination can also be accomplished in conjunction with measuring tools commonly found on digital imaging systems. These tools commonly include a tool that allows the measurement of the distance between two points in the image. Hence, the distance from the edge of the image to a line on the ruler 202 having radiopaque markings, for example, the 20 mm mark, is measured in terms of the distance units of the primary receptor. A measurement of the distance between objects separated by a known distance, for example, the 10 mm and 20 mm marks on the ruler 202 having radiopaque markings, would allow a scale factor to be established to convert distance measured in the reference plane of the primary receptor to distance in the reference plane of the alignment test tool 1300.

Figure 18:
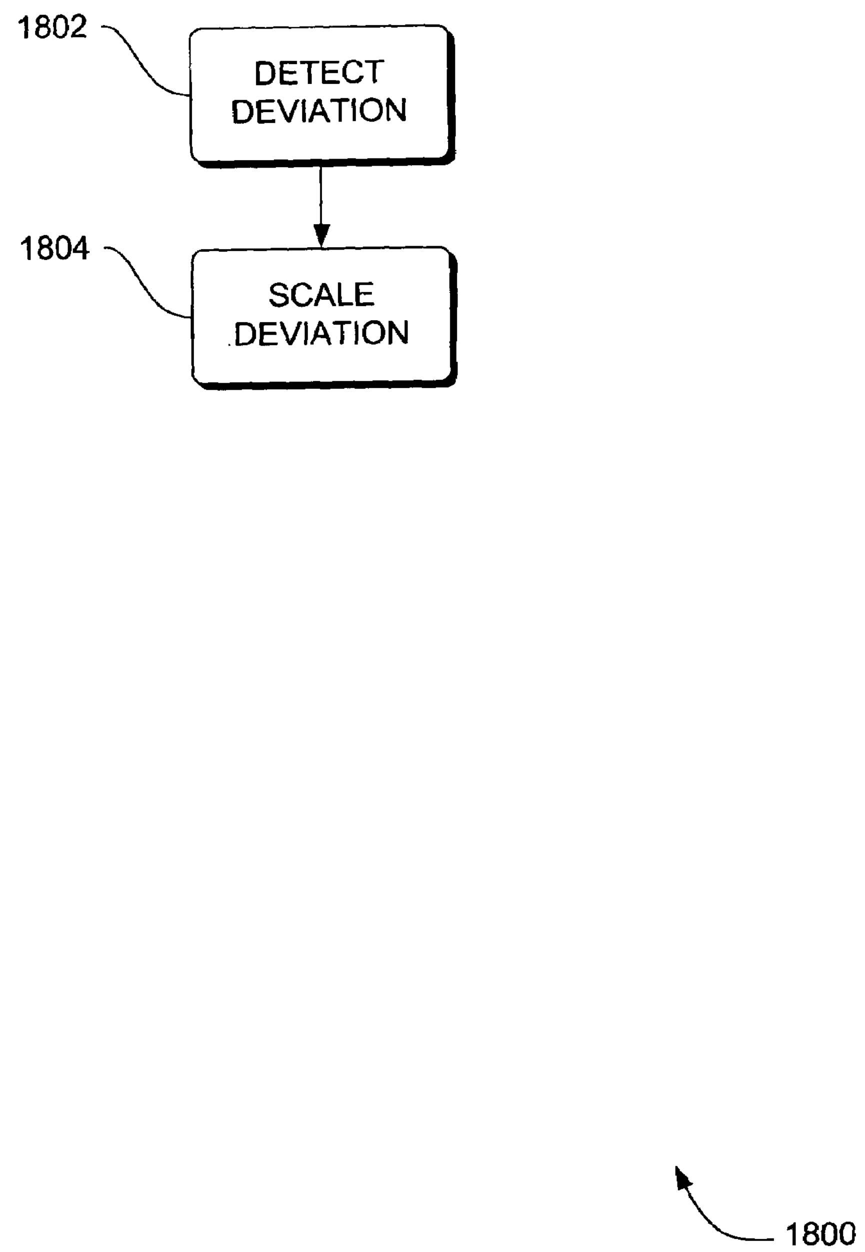
FIG. 18 is a flowchart of a method to determine alignment of an X-ray field to a visible light field.

FIG. 18 is a flowchart of a method 1800 to determine alignment of an X-ray field to a visible light field. The alignment between the fields is determined in a plane that is perpendicular to the central ray of the X-ray field.

Method 1800 includes detecting 1802 a deviation in a plane positioned between the sources of the visible light field and the X-ray field and a plane of the primary imaging detector. The visible light field and the X-ray field are projected along a center line that is perpendicular to the plane.

Method 1800 also includes scaling 1804 the deviation determined in the plane of the alignment test tool to another plane along the axis of the X-ray field, for example, the plane of the primary imaging receptor.

Figure 19:
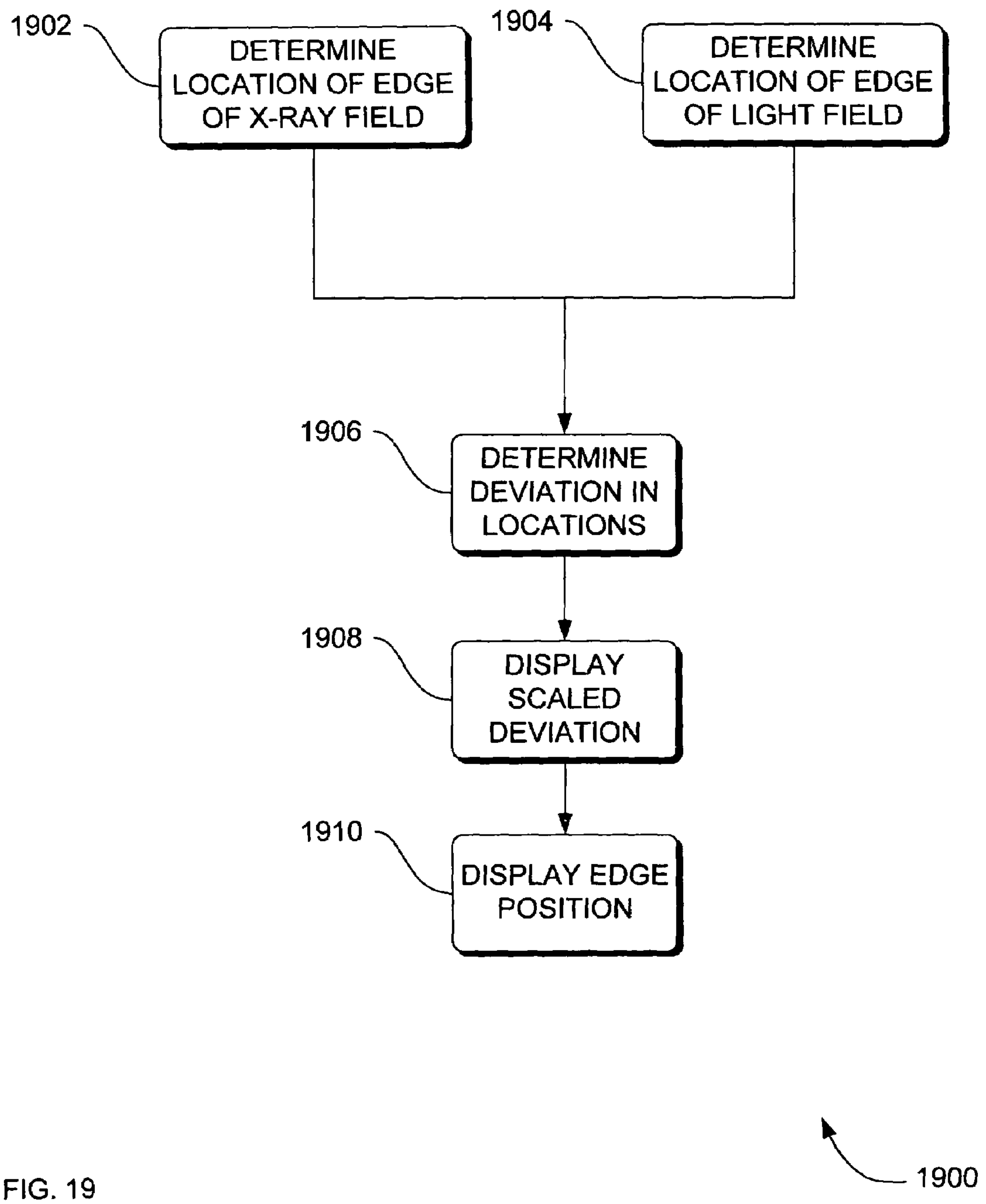
FIG. 19 is a flowchart of a method to detect a deviation.

FIG. 19 is a flowchart of a method 1900 to detect a deviation. Method 1900 is one embodiment of detecting 1802 a deviation in FIG. 18.

Method 1900 includes determining 1902 a location of an outer perimeter of the X-ray field and determining 1904 a location of an outer perimeter of the visible light field. Method 1900 subsequently includes determining 1906 the deviation in the locations.

In some embodiments, method 1900 further includes displaying 1908 the scaled deviation and/or displaying 1910 the location of where the outside boundary or edge of either one, or both of the electromagnetic fields project onto another plane.

Figure 20:
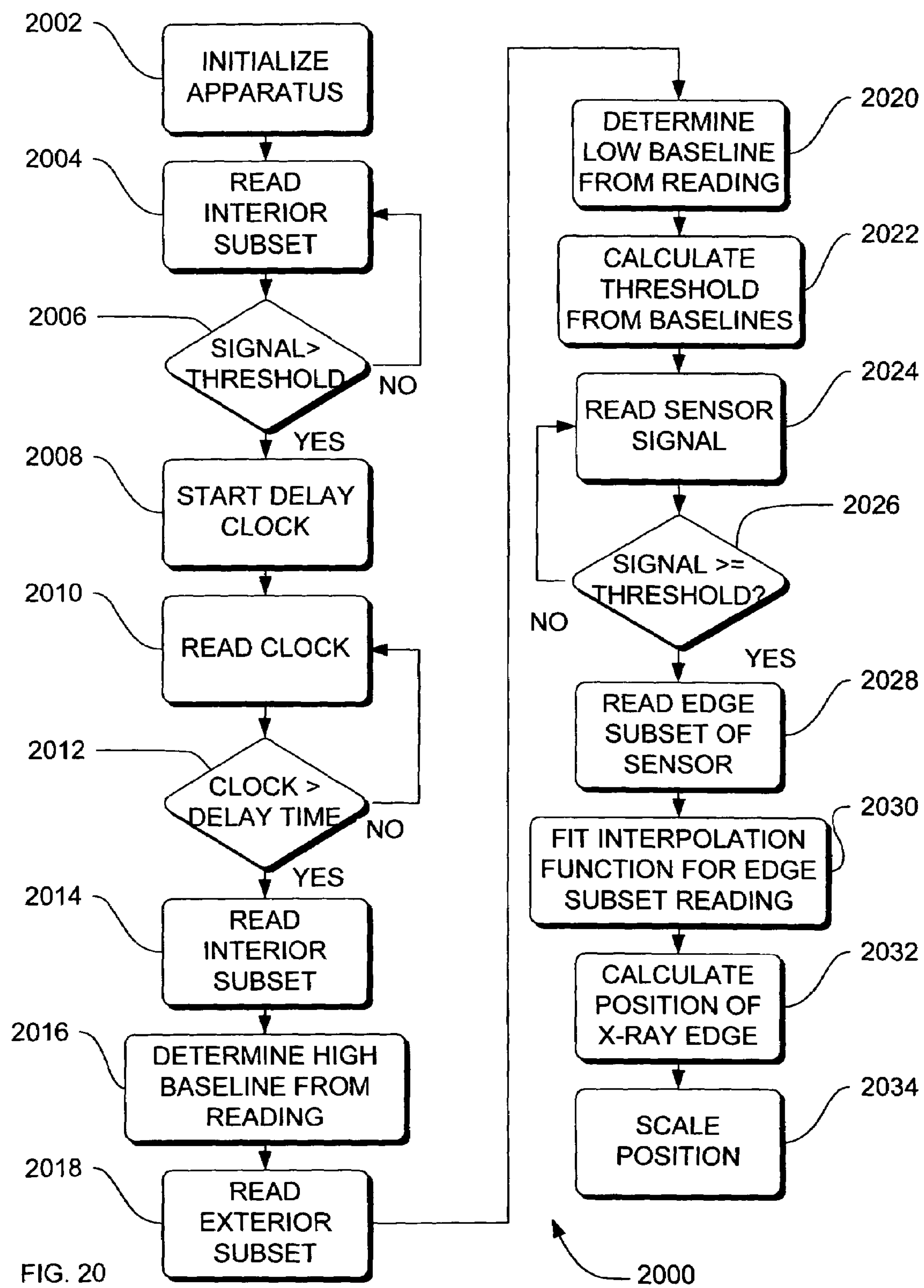
FIG. 20 is a flowchart of a method to determine the location of the outside perimeter of the X-ray field.

FIG. 20 is a flowchart of a method 2000 to determine the location of the outside perimeter of the X-ray field. Method 2000 is one embodiment of determining 1902 in FIG. 19.

Figure 21:
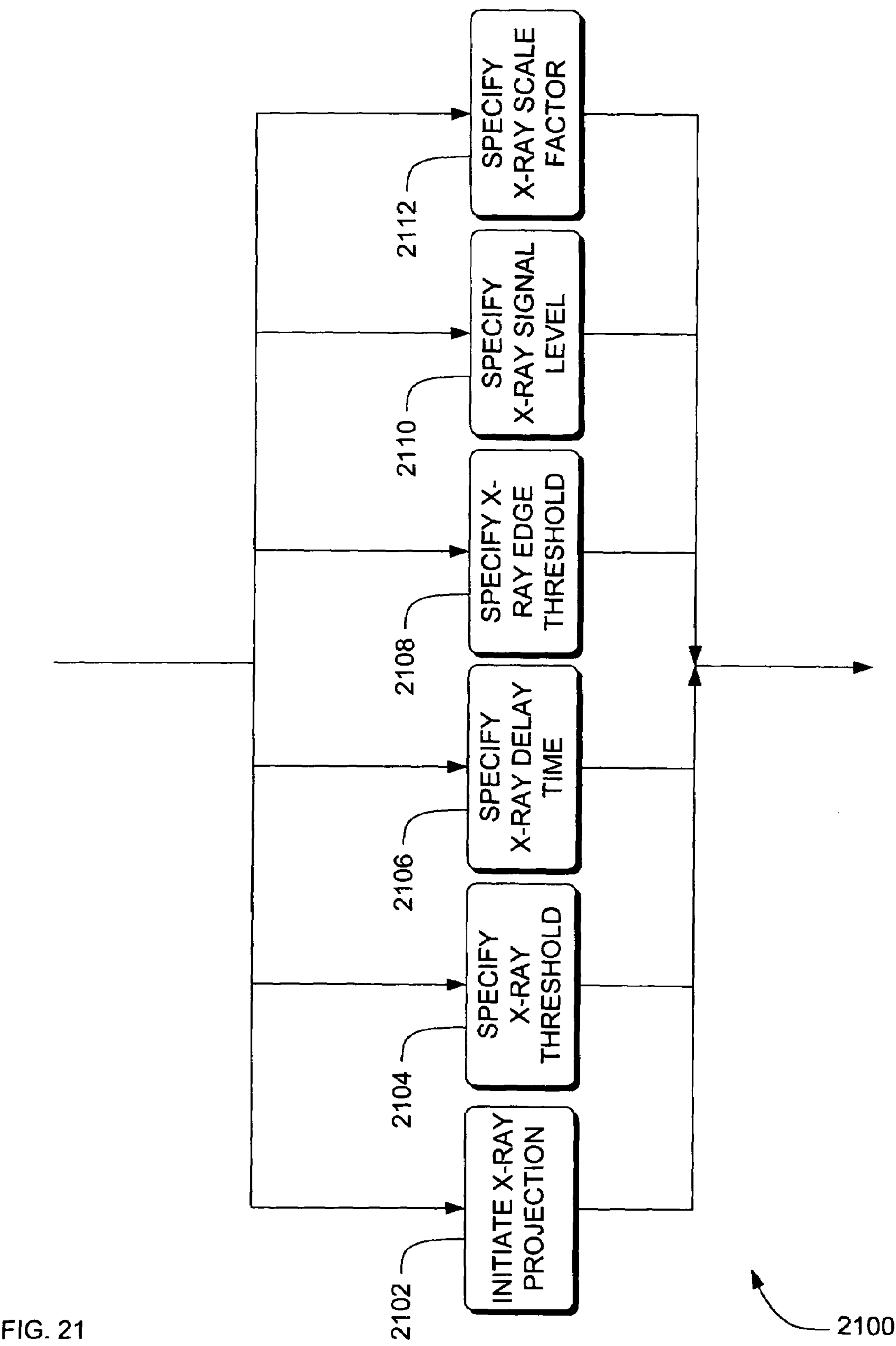
FIG. 21 is a flowchart of a method to initialize apparatus in preparation for determining the location of the outside perimeter of the X-ray field.

Method 2000 includes initializing 2002 apparatus in preparation for determining the location of the outside perimeter of the X-ray field. One embodiment of the initializing 2002 is shown in FIG. 21.

Thereafter method 2000 also includes reading 2004 a subset of the sensor that is interior to a light field alignment mark. The subset is read until a comparison 2006 indicates an electrical signal from the sensor exceeds the threshold.

Method 2000 also includes starting 2008 a delay time clock and reading 2010 the delay time clock, until a comparison 2012 of the delay time clock and the X-ray field delay time indicates that the delay time has elapsed. The delay time clock provides signal stabilization. In some embodiments a range of the delay time is zero seconds to five seconds.

Subsequently, method 2000 includes reading 2014 the subset of the sensor that is interior to a light field alignment mark.

Method 2000 also includes determining 2016 a high-level baseline from an average of data from the readings performed by action 2014 of the interior subset of the sensor.

Method 2000 further includes reading 2018 the sensor that is exterior to a light field alignment mark and determining 2020 a low-level baseline from an average of all of the data from the readings of the exterior subset of the sensor.

Thereafter, method 2000 also includes calculating 2022 a threshold from a function of the low-level baseline and the high-level baseline.

Subsequently, method 2000 also includes reading 2024 a signal from the sensor until a comparison 2026 indicates that the signal is not less than the edge detecting threshold signal.

Method 2000 also includes reading 2028 signals from the sensor in the approximate area of the edge to acquire an edge subset of signals.

Thereafter, method 2000 also includes fitting 2030 an interpolation function to the signal in the edge subset and calculating 2032 a position of the X-ray field edge.

In some embodiments, method 2000 also includes scaling 2034 an edge position of the X-ray field to a reference plane.

FIG. 21 is a flowchart of a method 2100 to initialize apparatus in preparation for determining the location of the outside perimeter of the X-ray field. Method 2100 is one embodiment of initializing 2002 in FIG. 20.

Method 2100 includes initiating 2102 a projection of the X-ray field from an electromagnetic source onto a sensor.

Method 2100 also includes specifying 2104 a threshold level of signal detection of the X-ray field. The threshold level is set in order to reliably detect the edge of the X-ray field.

Method 2100 also includes specifying 2106 an X-ray field delay time, specifying 2108 an edge detecting threshold signal level, specifying 2110 an edge defining signal level and specifying 2112 a position scaling factor.

Figure 22:
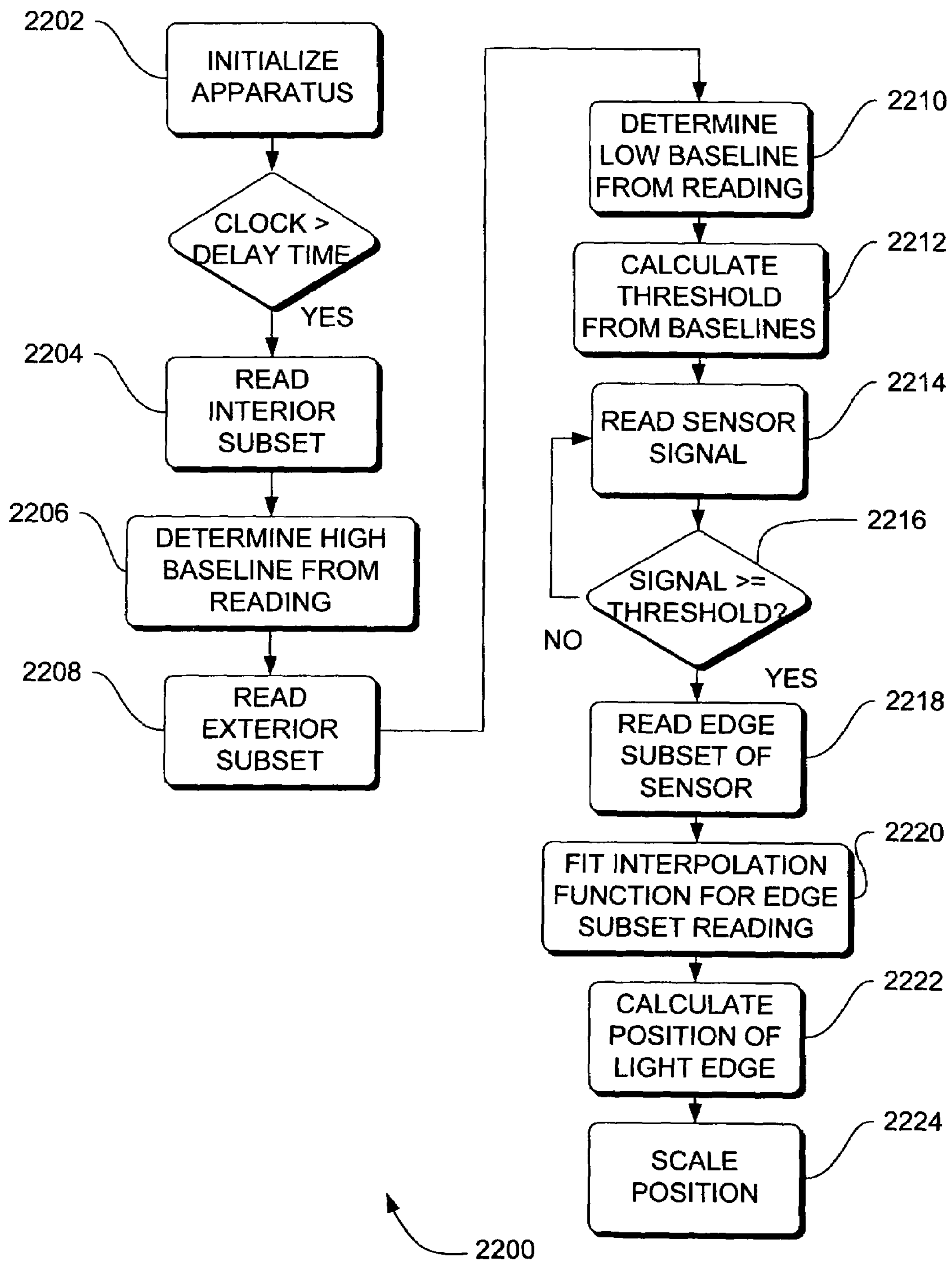
FIG. 22 is a flowchart of a method to determine the location of the outside perimeter of the visible light field.

FIG. 22 is a flowchart of a method 2200 to determine the location of the outside perimeter of the visible light field. Method 2200 is one embodiment of determining 1904 in FIG. 19.

Figure 23:
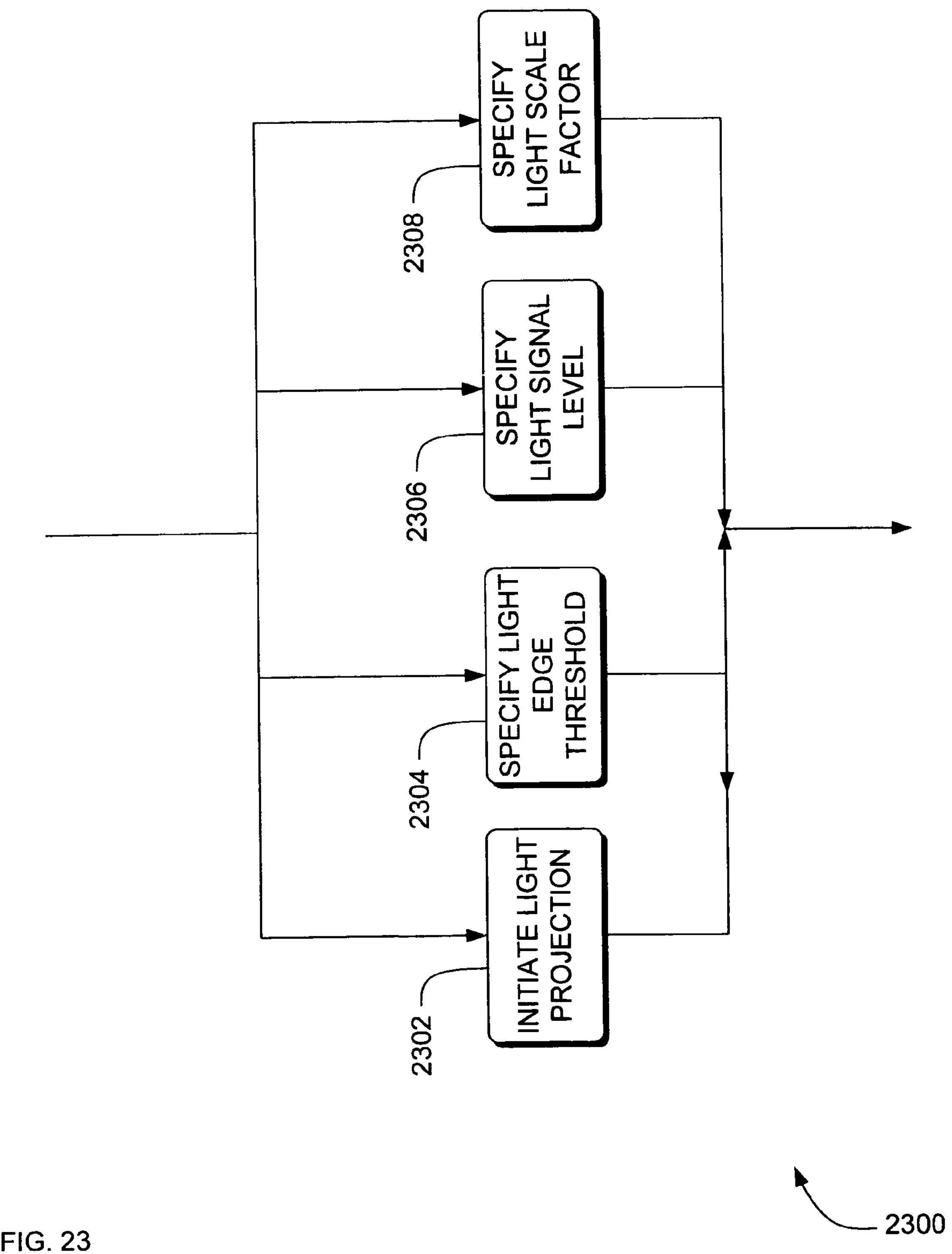
FIG. 23 is a flowchart of a method to initialize apparatus in preparation for determining the location of the outside perimeter of the visible light field.

Method 2200 includes initializing 2202 apparatus in preparation for determining the location of the outside perimeter of the visible light field. One embodiment of the initializing 2202 is shown in FIG. 23.

Method 2200 includes reading 2204 the subset of the sensor that is interior to a light field alignment mark.

Method 2200 also includes determining 2206 a high-level baseline from an average of data from the readings performed by action 2204 of the interior subset of the sensor.

Method 2200 further includes reading 2208 a subset of the sensor that is exterior to a light field alignment mark and determining 2210 a low-level baseline from an average of the data from the readings of the exterior subset of the sensor.

Thereafter, method 2200 also includes calculating 2212 a threshold from a function of the low-level baseline and the high-level baseline.

Subsequently, method 2200 also includes reading 2214 a signal from the sensor until a comparison 2216 indicates that the signal is not less than the edge detecting threshold signal level.

Method 2200 also includes reading 2218 signals from the subset of the sensor in the approximate area of the edge, to acquire an edge subset of signals.

Thereafter, method 2200 also includes fitting 2220 an interpolation function to the signals in the edge subset and calculating 2222 a position of the visible light field edge.

In some embodiments, method 2200 also includes scaling 2224 an edge position of the visible light field to a reference plane.

FIG. 23 is a flowchart of a method 2300 to initialize apparatus in preparation for determining the location of the outside perimeter of the visible light field. Method 2300 is one embodiment of initializing 2202 in FIG. 22.

Method 2300 includes initiating 2302 a projection of the visible light field from an electromagnetic source onto a sensor. The sensor is sensitive to the visible light field and is positioned between the electromagnetic source and the primary receptor.

Method 2300 also includes specifying 2304 an edge detecting threshold signal level, specifying 2306 an edge defining signal level and specifying 2308 a position scaling factor.

In some embodiments, methods 1800–2300 are implemented as a computer data signal embodied in a carrier wave, that represents a sequence of instructions which, when executed by a processor, such as processor 2404 in FIG. 24, cause the processor to perform the respective method. In other embodiments, methods 1800–2300 are implemented as a computer-accessible medium having executable instructions capable of directing a processor, such as processor 2404 in FIG. 24, to perform the respective method. In varying embodiments, the medium is a magnetic medium, an electronic medium, or an optical medium.

Hardware and Operating Environment

FIG. 24 is a block diagram of the hardware and operating environment 2400 in which different embodiments can be practiced. The description of FIG. 24 provides an overview of computer hardware and a suitable computing environment in conjunction with which some embodiments can be implemented. Embodiments are described in terms of a computer executing computer-executable instructions. However, some embodiments can be implemented entirely in computer hardware in which the computer-executable instructions are implemented in read-only memory. Some embodiments can also be implemented in client/server computing environments where remote devices that perform tasks are linked through a communications network. Program modules can be located in both local and remote memory storage devices in a distributed computing environment.

Computer 2402 includes a processor 2404, commercially available from Intel, Motorola, Cyrix and others. Computer 2402 also includes random-access memory (RAM) 2406, read-only memory (ROM) 2408, and one or more mass storage devices 2410, and a system bus 2412, that operatively couples various system components to the processing unit 2404. The memory 2406, 2408, and mass storage devices, 2410, are types of computer-accessible media. Mass storage devices 2410 are more specifically types of nonvolatile computer-accessible media and can include one or more hard disk drives, floppy disk drives, optical disk drives, and tape cartridge drives. The processor 2404 executes computer programs stored on the computer-accessible media.

Computer 2402 can be communicatively connected to the Internet 2414 via a communication device 2416. Internet 2414 connectivity is well known within the art. In one embodiment, a communication device 2416 is a modem that responds to communication drivers to connect to the Internet via what is known in the art as a “dial-up connection.” In another embodiment, a communication device 2416 is an Ethernet® or similar hardware network card connected to a local-area network (LAN) that itself is connected to the Internet via what is known in the art as a “direct connection” (e.g., T1 line, etc.).

A user enters commands and information into the computer 2402 through input devices such as a keyboard 2418 or a pointing device 2420. The keyboard 2418 permits entry of textual information into computer 2402, as known within the art, and embodiments are not limited to any particular type of keyboard. Pointing device 2420 permits the control of the screen pointer provided by a graphical user interface (GUI) of operating systems such as versions of Microsoft Windows®. Embodiments are not limited to any particular pointing device 2420. Such pointing devices include mice, touch pads, trackballs, remote controls and point sticks. Other input devices (not shown) can include a microphone, joystick, game pad, satellite dish, scanner, or the like.

In some embodiments, computer 2402 is operatively coupled to a display device 2422. Display device 2422 is connected to the system bus 2412. Display device 2422 permits the display of information, including computer, video and other information, for viewing by a user of the computer. Embodiments are not limited to any particular display device 2422. Such display devices include cathode ray tube (CRT) displays (monitors), as well as flat panel displays such as liquid crystal displays (LCD’s). In addition to a monitor, computers typically include other peripheral input/output devices such as printers (not shown). Speakers 2424 and 2426 provide audio output of signals. Speakers 2424 and 2426 are also connected to the system bus 2412.

Computer 2402 also includes an operating system (not shown) that is stored on the computer-accessible media RAM 2406, ROM 2408, and mass storage device 2410, and is executed by the processor 2404. Examples of operating systems include Microsoft Windows®, Apple MacOS®, Linux®, UNIX®. Examples are not limited to any particular operating system, however, and the construction and use of such operating systems are well known within the art.

Embodiments of computer 2402 are not limited to any type of computer 2402. In varying embodiments, computer 2402 comprises a PC-compatible computer, a MacOS®-compatible computer, a Linux®-compatible computer, or a UNIX®-compatible computer. The construction and operation of such computers are well known within the art.

Computer 2402 can be operated using at least one operating system to provide a graphical user interface (GUI) including a user-controllable pointer. Computer 2402 can have at least one web browser application program executing within at least one operating system, to permit users of computer 2402 to access intranet or Internet world-wide-web pages as addressed by Universal Resource Locator (URL) addresses. Examples of browser application programs include Netscape Navigator® and Microsoft Internet Explorer®.

The computer 2402 can operate in a networked environment using logical connections to one or more remote computers, such as remote computer 2428. These logical connections are achieved by a communication device coupled to, or a part of, the computer 2402. Embodiments are not limited to a particular type of communications device. The remote computer 2428 can be another computer, a server, a router, a network PC, a client, a peer device or other common network node. The logical connections depicted in FIG. 24 include a local-area network (LAN) 2430 and a wide-area network (WAN) 2432. Such networking environments are commonplace in offices, enterprise-wide computer networks, intranets and the Internet.

When used in a LAN-networking environment, the computer 2402 and remote computer 2428 are connected to the local network 2430 through network interfaces or adapters 2434, which is one type of communications device 2416. Remote computer 2428 also includes a network device 2436. When used in a conventional WAN-networking environment, the computer 2402 and remote computer 2428 communicate with a WAN 2432 through modems (not shown). The modem, which can be internal or external, is connected to the system bus 2412. In a networked environment, program modules depicted relative to the computer 2402, or portions thereof, can be stored in the remote computer 2428.

Computer 2402 also includes power supply 2438. Each power supply can be a battery.

CONCLUSION

An electronic alignment test tool for electromagnetic fields has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations. For example, although described in general terms, one of ordinary skill in the art will appreciate that implementations can be made in medical imaging or industrial imaging environments. The embodiments can be readily implemented for use with full-field digital mammography systems and/or digital radiography systems.

In particular, one of skill in the art will readily appreciate that the names of the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments. One of skill in the art will readily recognize that embodiments are applicable to X-ray imaging systems.

The terminology used in this application is meant to include all environments and alternate technologies which provide the same functionality as described herein.

We claim:

1. An apparatus to detect electromagnetic energy of a plurality of wavelengths, the apparatus comprising:

a ruler having a plurality of radiopaque markings;

a sensor of visible light electromagnetic energy mounted to the ruler; and a sensor of X-ray electromagnetic energy mounted to the ruler.

2. The apparatus of claim 1, wherein the sensor of visible light electromagnetic energy further comprises:

a photo-resistive sensor of visible light electromagnetic energy.

3. The apparatus of claim 1, wherein the sensor of visible light electromagnetic energy further comprises:

a photo-conductive sensor of visible light electromagnetic energy.

4. The apparatus of claim 3, wherein the photo-conductive sensor of visible light electromagnetic energy further comprises:

a photodiode array sensor of visible light electromagnetic energy.

5. The apparatus of claim 1, wherein the sensor of visible light electromagnetic energy further comprises:

a sensor of visible light electromagnetic energy positioned not more than 1 millimeter from any other sensor of visible light electromagnetic energy.

6. The apparatus of claim 1, wherein the sensor of X-ray electromagnetic energy further comprises:

a photo-resistive sensor of X-ray electromagnetic energy.

7. The apparatus of claim 1, wherein the sensor of X-ray electromagnetic energy further comprises:

a photo-conductive sensor of X-ray electromagnetic energy further comprising a layer of scintillating material.

8. The apparatus of claim 7, wherein the photo-conductive sensor of X-ray electromagnetic energy further comprises:

a photo-diode array sensor of X-ray electromagnetic energy further comprising a layer of scintillating material.

9. The apparatus of claim 1, wherein the sensor of visible light electromagnetic energy is mounted directly to the ruler.

10. The apparatus of claim 9, wherein the sensor of X-ray electromagnetic energy is mounted to the ruler through the sensor of visible light electromagnetic energy.

11. The apparatus of claim 9, wherein the sensor of X-ray electromagnetic energy is mounted directly to the ruler.

12. The apparatus of claim 1, wherein the sensor of X-ray electromagnetic energy further comprises:

a sensor of X-ray electromagnetic energy positioned not more than 1 millimeter from any other sensor of X-ray electromagnetic energy and a length of at least 40 millimeters.

13. The apparatus of claim 1, wherein the ruler further comprises:

a visible light alignment mark.

14. The apparatus of claim 1, wherein the apparatus further comprises:

a sensor carriage comprising the ruler.

15. The apparatus of claim 14, wherein the sensor carriage further comprises a tubular shaped body, the body having a hole through one side, and a position locking shaft extending through the hole; and a position locking knob operably coupled to an end of the position locking shaft that is outside of the tubular shaped body.

16. The apparatus of claim 15, wherein the sensor carriage further comprises an adjustment track extending through the tubular shaped body, and wherein the position locking shaft is operable to contact the adjustment track.

17. A detector element comprising:

a sensor carriage having a tubular shaped body comprising a ruler, the ruler comprising a visible light alignment mark and radiopaque markings, the body having a hole through one side;

a position locking shaft extending through the hole of the tubular shaped body of the sensor carriage;

a position locking knob operably coupled to an end of the position locking shaft that is outside of the tubular shaped body;

a sensor of visible light electromagnetic energy directly mounted to the ruler; and a sensor of X-ray electromagnetic energy directly mounted to the sensor of visible light electromagnetic energy.

18. The detector of claim 17, wherein the sensor carriage further comprises an adjustment track extending through the tubular shaped body, and wherein the position locking shaft is operable to contact the adjustment track.

19. The detector of claim 17, wherein the sensor of visible light electromagnetic energy further comprises:

a photo-resistive sensor of visible light electromagnetic energy.

20. The detector of claim 17, wherein the sensor of visible light electromagnetic energy further comprises:

a photo-conductive array sensor of visible light electromagnetic energy.

21. The detector of claim 20, wherein the photo-conductive sensor of visible light electromagnetic energy further comprises:

a photodiode array sensor of visible light electromagnetic energy.

22. The detector of claim 17, wherein the sensor of visible light electromagnetic energy further comprises:

a sensor of visible light electromagnetic energy positioned not more than 1 millimeter from any other sensor of visible light electromagnetic energy.

23. The detector of claim 17, wherein the sensor of X-ray electromagnetic energy further comprises:

a sensor of X-ray electromagnetic energy positioned not more than 1 millimeter from any other sensor of X-ray electromagnetic energy and a length of at least 40 millimeters.

24. The detector of claim 17, wherein the sensor of X-ray electromagnetic energy further comprises:

a photo-resistive sensor of X-ray electromagnetic energy.

25. The detector of claim 17, wherein the sensor of X-ray electromagnetic energy further comprises:

a photo-conductive sensor of X-ray electromagnetic energy.

26. The detector of claim 25, wherein the photo-conductive sensor of X-ray electromagnetic energy further comprises:

a photodiode array sensor of X-ray electromagnetic energy.

27. The detector of claim 26, wherein the photodiode array sensor further comprises:

a layer of scintillating material.

28. A detector element comprising:

a sensor carriage having a tubular shaped body comprising a ruler, the ruler comprising a visible light alignment mark and radiopaque markings, the body having a hole through one side;

a position locking shaft extending through the hole of the tubular shaped body of the sensor carriage;

a position locking knob operably coupled to an end of the position locking shaft that is outside of the tubular shaped body;

a photodiode photo-conductive array sensor of visible light electromagnetic energy, the sensor of visible light electromagnetic energy being directly mounted to the ruler; and a photodiode photo-conductive array sensor of X-ray electromagnetic energy further comprising a layer of scintillating material, the sensor of X-ray electromagnetic energy being directly mounted to the sensor of visible light electromagnetic energy.

29. The detector of claim 28, wherein the sensor carriage further comprises:

an adjustment track extending through the tubular shaped body, and wherein the position locking shaft is operable to contact the adjustment track.

30. The detector of claim 28, wherein the sensor of visible light electromagnetic energy further comprises:

a sensor of visible light electromagnetic energy positioned not more than 1 millimeter from any other sensor of visible light electromagnetic energy.

31. The detector of claim 28, wherein the sensor of X-ray electromagnetic energy further comprises:

a sensor of X-ray electromagnetic energy positioned not more than 1 millimeter from any other sensor of X-ray electromagnetic energy and a length of at least 40 millimeters.

32. A detector element comprising:

a means for supporting a ruler having radiopaque markings, the ruler comprising a means to identify an edge of visible light, the means for supporting having a hole through one side;

a means for locking a position of a shaft, extending through the hole;

a means for turning the means for locking a position of a shaft, operably coupled to an end of the means for locking a position;

a means for photo-resistively sensing visible light electromagnetic energy, being directly mounted to the ruler; and a means for photo-resistively sensing X-ray electromagnetic energy through a layer of scintillating material, being directly mounted to the means for photo-resistively sensing visible light.

33. An alignment test tool comprising:

a plurality sensors consisting of:

a plurality of electronic sensors of X-ray electromagnetic energy; and a plurality of electronic sensors of visible light electromagnetic energy, and a plurality of displays, the number of displays being the number of the plurality of sensors, each display operably coupled to one of the plurality of sensors, each display being operable to display the position of an edge of the electromagnetic energy sensed by the sensor.

34. The alignment test tool of claim 33, wherein each of the sensors further comprises:

a photodiode photo-conductive array sensor.

35. The alignment test tool of claim 33, wherein each of the plurality of electronic sensors of X-ray electromagnetic energy further comprises:

a layer of scintillating material.

36. The alignment test tool of claim 33, wherein each of the plurality of electronic sensors of X-ray electromagnetic energy further comprises:

a layer of scintillating material; and a photodiode photo-conductive array sensor.

37. The alignment test tool of claim 33, wherein each of the sensors of electromagnetic energy further comprises:

a sensor of electromagnetic energy positioned not more than 1 millimeter from any other sensor of electromagnetic energy.

38. An alignment test tool comprising:

a plurality of sensors consisting of:

a plurality of electronic sensors of X-ray electromagnetic energy; and a plurality of electronic sensors of visible light electromagnetic energy, and a display being operable to display the position of a plurality of edges of the X-ray electromagnetic energy sensed by the electronic sensors of X-ray electromagnetic energy; and a display being operable to display the position of a plurality of edges of the visible light electromagnetic energy sensed by the sensors of visible light electromagnetic energy.

39. The alignment test tool of claim 38, wherein each of the sensors further comprises:

a photodiode photo-conductive array sensor.

40. The alignment test tool of claim 38, wherein each of the plurality of electronic sensors of X-ray electromagnetic energy further comprises:

a layer of scintillating material.

41. The alignment test tool of claim 38, wherein each of the sensors of electromagnetic energy further comprises:

a sensor of electromagnetic energy positioned not more than 1 millimeter from any other sensor of electromagnetic energy.

42. An alignment test tool comprising:

a plurality of sensors consisting of:

a plurality of electronic sensors of X-ray electromagnetic energy; and a plurality of electronic sensors of visible light electromagnetic energy, and a display being operable to display the position of a plurality of edges of the X-ray electromagnetic energy sensed by the electronic sensors of X-ray electromagnetic energy and operable to display the position of a plurality of edges of the visible light electromagnetic energy sensed by the sensors of visible light electromagnetic energy.

43. The alignment test tool of claim 42, wherein each of the sensors further comprises:

a photodiode photo-conductive array sensor.

44. The alignment test tool of claim 42, wherein each of the plurality of electronic sensors of X-ray electromagnetic energy further comprises:

a layer of scintillating material.

45. The alignment test tool of claim 42, wherein each of the sensors of electromagnetic energy further comprises:

a sensor of electromagnetic energy positioned not more than 1 millimeter from any other sensor of electromagnetic energy.

46. An image receptor alignment test tool comprising:

at least one detector element, each detector element comprising:

a ruler having radiopaque markings;

a sensor of visible light electromagnetic energy mounted to the ruler; and a sensor of X-ray electromagnetic energy mounted to the ruler, and at least one sensor carriage fixedly attached to the at least one detector element, each sensor carriage comprising:

a tubular shaped body, each body having a hole through one side, one sensor carriage for each detector unit, and at least one position locking shaft extending through each hole, one position locking shaft for each detector unit; and a position locking knob operably coupled to an end of the position locking shaft that is outside of the tubular shaped body, one position locking shaft for each detector.

47. The image receptor alignment test tool of claim 46, wherein the at least one detector element further comprises:

four detector elements.

48. The image receptor alignment test tool of claim 46, wherein the four detector elements further comprise:

four detector elements, each of which is positioned towards a different outside edge of a four-sided plane.

49. The image receptor alignment test tool of claim 46, wherein a four-sided plane further comprises:

a rectangular plane.

50. The image receptor alignment test tool of claim 46, wherein each of the at least one detector element is fixedly attached to a carriage.

51. The image receptor alignment test tool of claim 46, wherein each of the sensors further comprises:

a sensor positioned not more than 1 millimeter from any other sensor and a length of at least 40 millimeters.

52. The image receptor alignment test tool of claim 46, wherein the sensor carriage further comprises an adjustment track extending through the tubular shaped body, and wherein the position locking shaft is operable to contact the adjustment track.

53. The image receptor alignment test tool of claim 46, further comprising:

a controller operable to receive electrical signals from the at least one sensor of visible light electromagnetic energy, and operable to receive electrical signals from the at least one sensor of X-ray electromagnetic energy.

54. The image receptor alignment test tool of claim 53, wherein the controller further comprises:

a controller operable to generate information describing the position of the edge of the visible light.

55. The image receptor alignment test tool of claim 54, further comprising:

at least one display operable to display the information describing the position of the edge of the visible light.

56. The image receptor alignment test tool of claim 55, wherein the at least one display further comprises:

a light-emitting-diode display.

57. The image receptor alignment test tool of claim 55, wherein the at least one display further comprises:

a liquid-crystal-diode display.

58. The image receptor alignment test tool of claim 54, wherein the controller further comprises:

a controller operable to generate information describing the position of an edge of the X-ray electromagnetic energy.

59. The image receptor alignment test tool of claim 58, further comprising:

at least one display operable to display the information describing the position of the edge of the X-ray field.

60. The image receptor alignment test tool of claim 59, wherein the at least one display further comprises:

a light-emitting-diode display.

61. The image receptor alignment test tool of claim 59, wherein the at least one display further comprises:

a liquid-crystal-diode display.

62. The image receptor alignment test tool of claim 53, wherein the controller further comprises:

a controller operable to generate information describing the deviation of the positions of the edge of the visible light electromagnetic energy and the X-ray electromagnetic energy.

63. The image receptor alignment test tool of claim 62, further comprising:

at least one display operable to display the deviation.

64. The image receptor alignment test tool of claim 62, wherein the at least one display further comprises:

a light-emitting-diode display.

65. The image receptor alignment test tool of claim 62, wherein the at least one display further comprises:

a liquid-crystal-diode display.

66. The image receptor alignment test tool of claim 62, further comprising:

a scale factor object on a face of the image receptor alignment test tool.

67. The image receptor alignment test tool of claim 62, wherein the scale factor object further comprises:

a scale factor object having a diameter of about twenty-five millimeters.

68. The image receptor alignment test tool of claim 53, wherein the controller further comprises:

a controller operable to scale the deviation in reference to the actual size of the scale factor object relative to a size of the scale factor object as projected into a plane intersecting the beam of electromagnetic energy.

69. The image receptor alignment test tool of claim 46, further comprising:

at least one control.

70. The image receptor alignment test tool of claim 69, wherein the at least one control further comprises:

a reset button operable to reset a controller.

71. The image receptor alignment test tool of claim 69, wherein the at least one control further comprises:

an ON/OFF button that controls power to the alignment test tool image electronics.

72. An image receptor alignment test tool comprising:

a first detector element, each detector element comprising:

a first ruler having radiopaque markings;

a sensor of visible light electromagnetic energy mounted to the ruler, the sensor of visible light electromagnetic energy positioned not more than 1 millimeter from any other sensor of visible light electromagnetic energy and having length of at least 40 millimeters; and a sensor of X-ray electromagnetic energy mounted to the ruler, the sensor of X-ray electromagnetic energy having a sensor of X-ray electromagnetic energy positioned not more than 1 millimeter from any other sensor of X-ray electromagnetic energy and having length of at least 40 millimeters, and a first sensor carriage fixedly attached to the first detector element, the first sensor carriage comprising:

a tubular shaped body, each body having a hole through one side, and a first position locking shaft extending through the first hole of the tubular shaped body of the first sensor carriage;

a first position locking knob fixed to the first position locking shaft;

a second detector element, each detector element comprising:

a second ruler having radiopaque markings;

a sensor of visible light electromagnetic energy mounted to the second ruler; and a sensor of X-ray electromagnetic energy mounted to the second ruler, wherein the second detector element is positioned at a right angle within a plane from the first detector element, and a second sensor carriage fixedly attached to the second detector element, the second sensor carriage comprising:

a tubular shaped body, each body having a hole through one side, and a second position locking shaft extending through the second hole of the tubular shaped body of the second sensor carriage;

a second position locking knob fixed to the second position locking shaft;

a third detector element, each detector element comprising:

a third ruler having radiopaque markings;

a sensor of visible light electromagnetic energy mounted to the third ruler; and a sensor of X-ray electromagnetic energy mounted to the third ruler, wherein the third detector element is positioned at a right angle within the plane from the second detector element, and a third sensor carriage fixedly attached to the third detector element, the third sensor carriage comprising:

a tubular shaped body, each body having a hole through one side, and a third position locking shaft extending through the third hole of the tubular shaped body of the third sensor carriage;

a third position locking knob fixed to the third position locking shaft;

a fourth detector element, each detector element comprising:

a fourth ruler having radiopaque markings;

a sensor of visible light electromagnetic energy mounted to the fourth ruler; and a sensor of X-ray electromagnetic energy mounted to the fourth ruler, wherein the fourth detector element is positioned at a right angle within the plane from the third detector element, wherein the fourth detector element is positioned at a right angle within the plane from the first detector element, and a fourth sensor carriage fixedly attached to the fourth detector element, the fourth sensor carriage comprising:

a tubular shaped body, each body having a hole through one side, and a fourth position locking shaft extending through the fourth hole of the tubular shaped body of the fourth sensor carriage;

a fourth position locking knob fixed to the fourth position locking shaft;

a controller operable to:

receive electrical signals from each of the sensors;

generate information describing a position of the edge of the visible light for each visible light sensor;

generate information describing a position of the edge of the X-ray energy for each X-ray sensor; and generate information describing the deviation of the positions of the edge of the visible light electromagnetic energy and the X-ray electromagnetic energy for each sensor, at least one display operable to display the deviation.

73. The image receptor alignment test tool of claim 72, wherein the at least one display further comprises:

a light-emitting-diode display.

74. The image receptor alignment test tool of claim 72, wherein the at least one display further comprises:

a liquid-crystal-diode display.

75. The image receptor alignment test tool of claim 72, further comprising:

a scale factor object on a face of the image receptor alignment test tool.

76. The image receptor alignment test tool of claim 75, wherein the scale factor object further comprises:

a scale factor object having a diameter of about twenty-five millimeters.

77. The image receptor alignment test tool of claim 72, wherein the controller further comprises:

a controller operable to scale the deviation in reference to the actual size of the scale factor object relative to a size of the scale factor object as projected into a plane intersecting the beam of electromagnetic energy.

78. The image receptor alignment test tool of claim 77, further comprising:

at least one control.

79. The image receptor alignment test tool of claim 78, wherein the at least one control further comprises:

a reset button operable to reset the controller.

80. The image receptor alignment test tool of claim 78, wherein the at least one control further comprises:

an ON/OFF button that controls power to the alignment test tool electronics.

81. The image receptor alignment test tool of claim 72, wherein each sensor carriage further comprises an adjustment track extending through the tubular shaped body, and wherein the position locking shaft is operable to contact the adjustment track.

82. An alignment test tool sensor unit comprising:

a window that is transparent to visible light electromagnetic energy and X-ray electromagnetic energy;

a sensor of a field of visible light electromagnetic energy mounted within the alignment test tool sensor unit behind the window;

a sensor of a field of X-ray electromagnetic energy mounted within the alignment test tool sensor unit behind the window; and a controller operably coupled to the sensor of visible light electromagnetic energy, the controller operable to receive first electrical signals from the sensor of visible light electromagnetic energy, the first signals indicating the extent of the visible light electromagnetic energy, the controller is further operably coupled to the sensor of X-ray electromagnetic energy, the controller operable to receive second electrical signals from the sensor of X-ray electromagnetic energy, the second signals indicating the extent of the X-ray electromagnetic energy, the controller is further operable to determine where the edge of each field is projected upon each of the sensors, and the controller is further operable to transmit information describing where the edges project or fall.

83. The alignment test tool sensor unit of claim 82, wherein controller is further operable to transmit through a conventional computer interface.

84. The alignment test tool sensor unit of claim 83, wherein the conventional computer interface further comprises:

a serial interface.

85. The alignment test tool sensor unit of claim 83, wherein the conventional computer interface further comprises:

a parallel interface.

86. The alignment test tool sensor unit of claim 83, wherein the conventional computer interface further comprises:

a wireless conventional computer interface.

87. The alignment test tool sensor unit of claim 82, wherein the image receptor alignment test tool further comprises:

a reference mark line that circumscribes the alignment test tool sensor unit around the sides, the reference mark line indicating a plane of the sensors which facilitates scaling measurements to a primary receptor plane.

88. The alignment test tool sensor unit of claim 82, wherein the image receptor alignment test tool further comprises:

at least one guide for light field alignment positioned on a face of the image receptor alignment test tool that comprises the window.

* * * * *